United States Patent
Takahashi et al.

(10) Patent No.: US 8,110,136 B2
(45) Date of Patent: Feb. 7, 2012

(54) METHOD AND APPARATUS FOR PRODUCING NANOFIBERS AND POLYMER WEB

(75) Inventors: Mitsuhiro Takahashi, Ehime (JP); Mikio Takezawa, Kagawa (JP); Yoshiaki Tominaga, Kanagawa (JP); Takahiro Kurokawa, Tokyo (JP); Kazunori Ishikawa, Osaka (JP); Hiroto Sumida, Nara (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 12/515,447

(22) PCT Filed: Nov. 20, 2007

(86) PCT No.: PCT/JP2007/072447
§ 371 (c)(1),
(2), (4) Date: Jul. 27, 2009

(87) PCT Pub. No.: WO2008/062784
PCT Pub. Date: May 29, 2008

(65) Prior Publication Data
US 2010/0072674 A1    Mar. 25, 2010

(30) Foreign Application Priority Data

Nov. 24, 2006  (JP) .................. 2006-317003
Aug. 8, 2007  (JP) .................. 2007-206071

(51) Int. Cl.
*D01D 5/18* (2006.01)
*D06M 10/00* (2006.01)
*H05B 7/00* (2006.01)

(52) U.S. Cl. .................. 264/465; 264/211.1; 264/211.14
(58) Field of Classification Search ............... 264/211.1, 264/211.14, 465
See application file for complete search history.

(56) References Cited

U.S. PATENT DOCUMENTS

| 5,114,631 | A | 5/1992 | Nyssen et al. |
| 7,655,175 | B2* | 2/2010 | Michael et al. ............... 264/465 |
| 2002/0089094 | A1* | 7/2002 | Kleinmeyer et al. ......... 264/465 |
| 2002/0122840 | A1 | 9/2002 | Lee et al. |
| 2006/0024399 | A1 | 2/2006 | Chang et al. |

(Continued)

FOREIGN PATENT DOCUMENTS

JP    4-228667    8/1992
(Continued)

OTHER PUBLICATIONS

English language Abstract of JP 4-228667, Aug. 18, 1992.
(Continued)

*Primary Examiner* — Leo B Tentoni
(74) *Attorney, Agent, or Firm* — Greenblum & Bernstein P.L.C.

(57) ABSTRACT

Nanofibers are formed from a polymer material by rotating a conductive rotating container having a plurality of small holes while supplying a polymer solution formed by dissolving a polymer material in a solvent into the rotating container, charging the polymer solution discharged from the small holes of the rotating container by charging means, and drawing the discharged filamentous polymer solution by centrifugal force and an electrostatic explosion resulting from evaporation of the solvent. The nanofibers from this production step are oriented and made to flow from one side toward the other side in a shaft center direction of the rotating container by a reflecting electrode and/or blowing means, or those nanofibers are deposited, to produce a polymer web. The nanofibers and the polymer web using these nanofibers can be produced uniformly by a simple configuration with good productivity.

3 Claims, 21 Drawing Sheets

U.S. PATENT DOCUMENTS

| | | | |
|---|---|---|---|
| 2006/0228435 A1* | 10/2006 | Andrady et al. | 264/465 X |
| 2006/0290031 A1 | 12/2006 | Jirsak et al. | |
| 2009/0102100 A1* | 4/2009 | Hellring et al. | 264/465 X |
| 2009/0189319 A1* | 7/2009 | Kim | 264/484 |

FOREIGN PATENT DOCUMENTS

| | | |
|---|---|---|
| JP | 2002-201559 | 7/2002 |
| JP | 2006-37329 | 2/2006 |
| WO | 2005/024101 | 3/2005 |

OTHER PUBLICATIONS

English language Abstract of JP 2002-201559, Jul. 19, 2002.
English language Abstract of JP 2006-37329, Feb. 9, 2006.

* cited by examiner

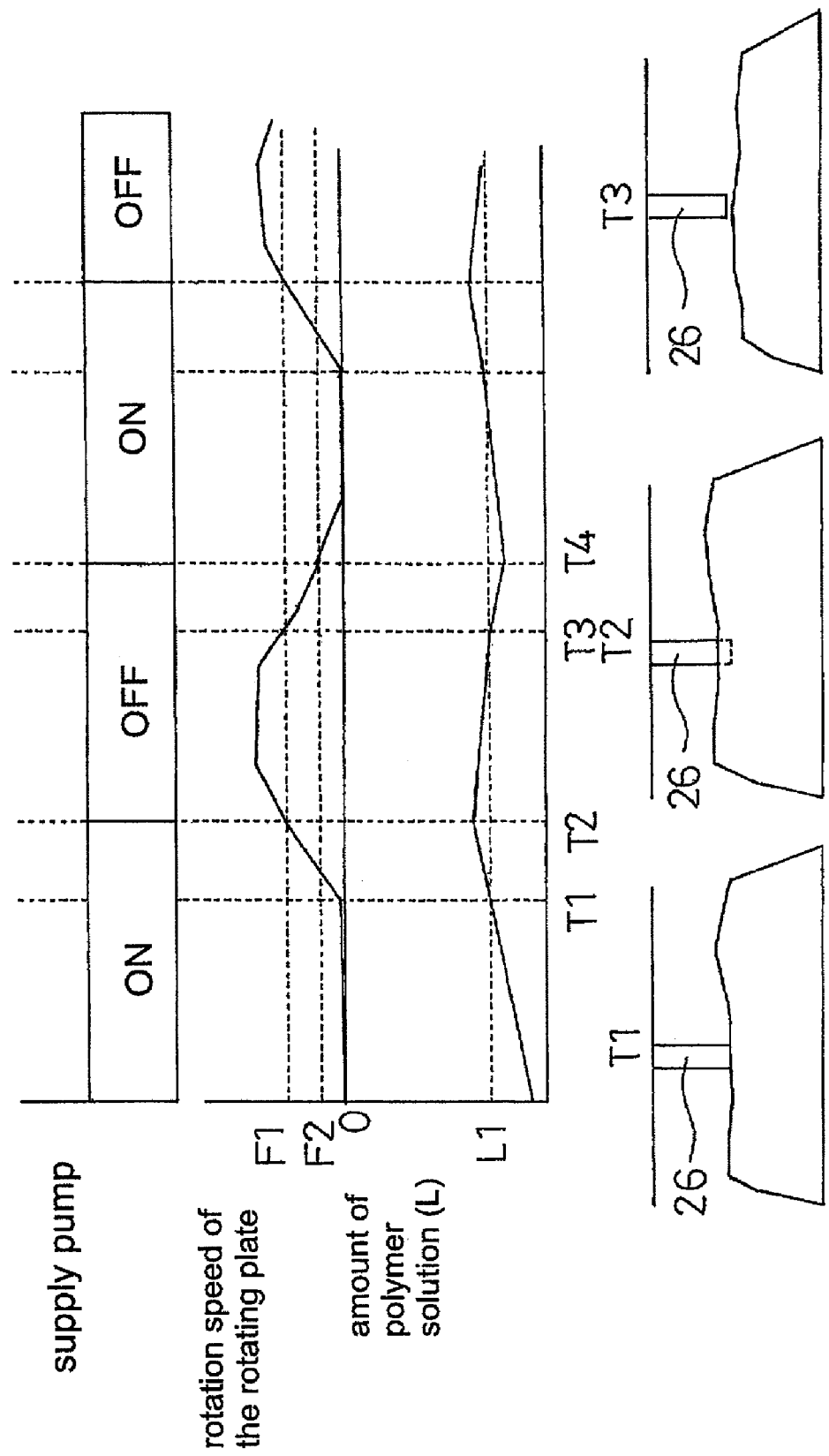

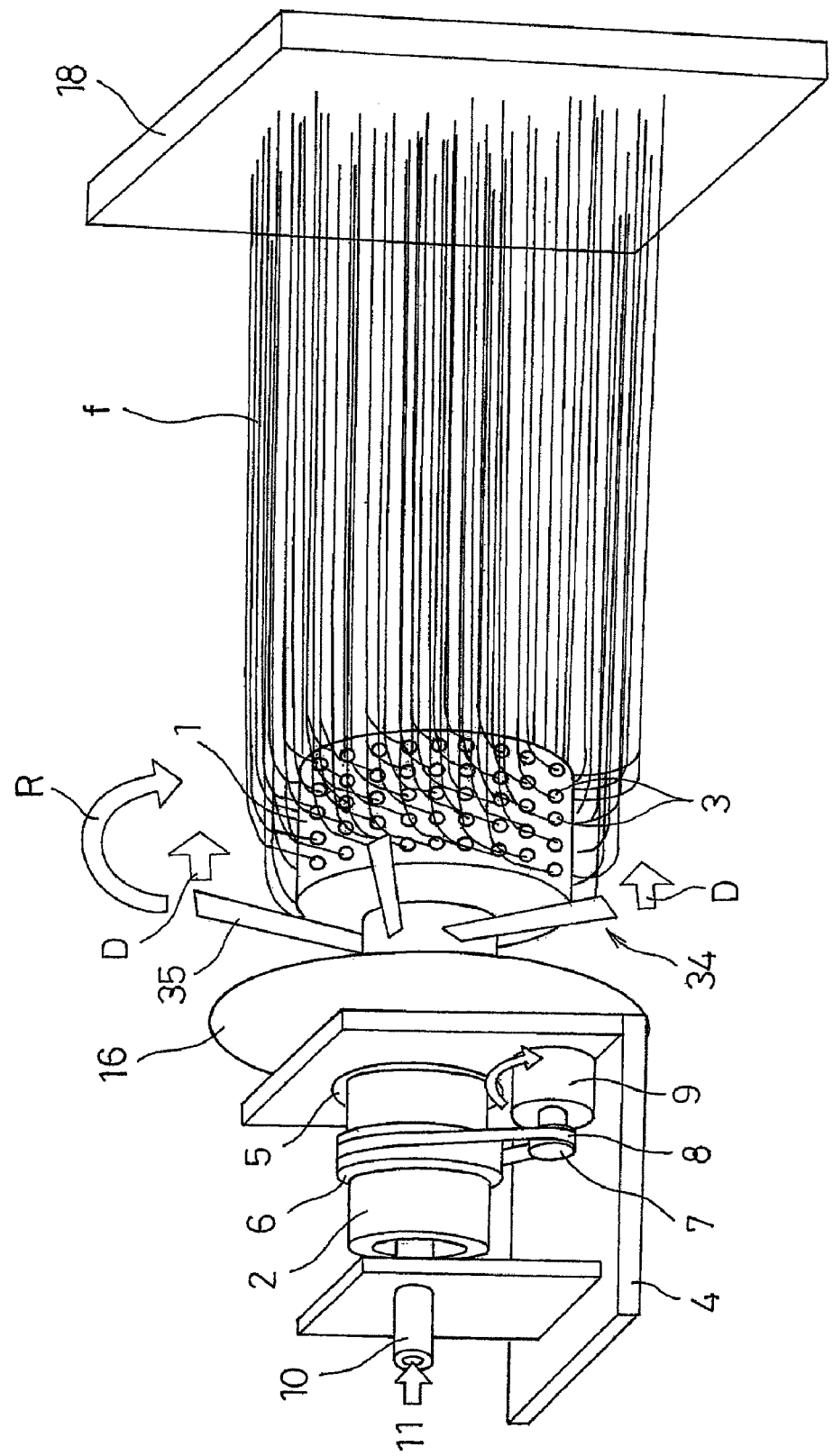

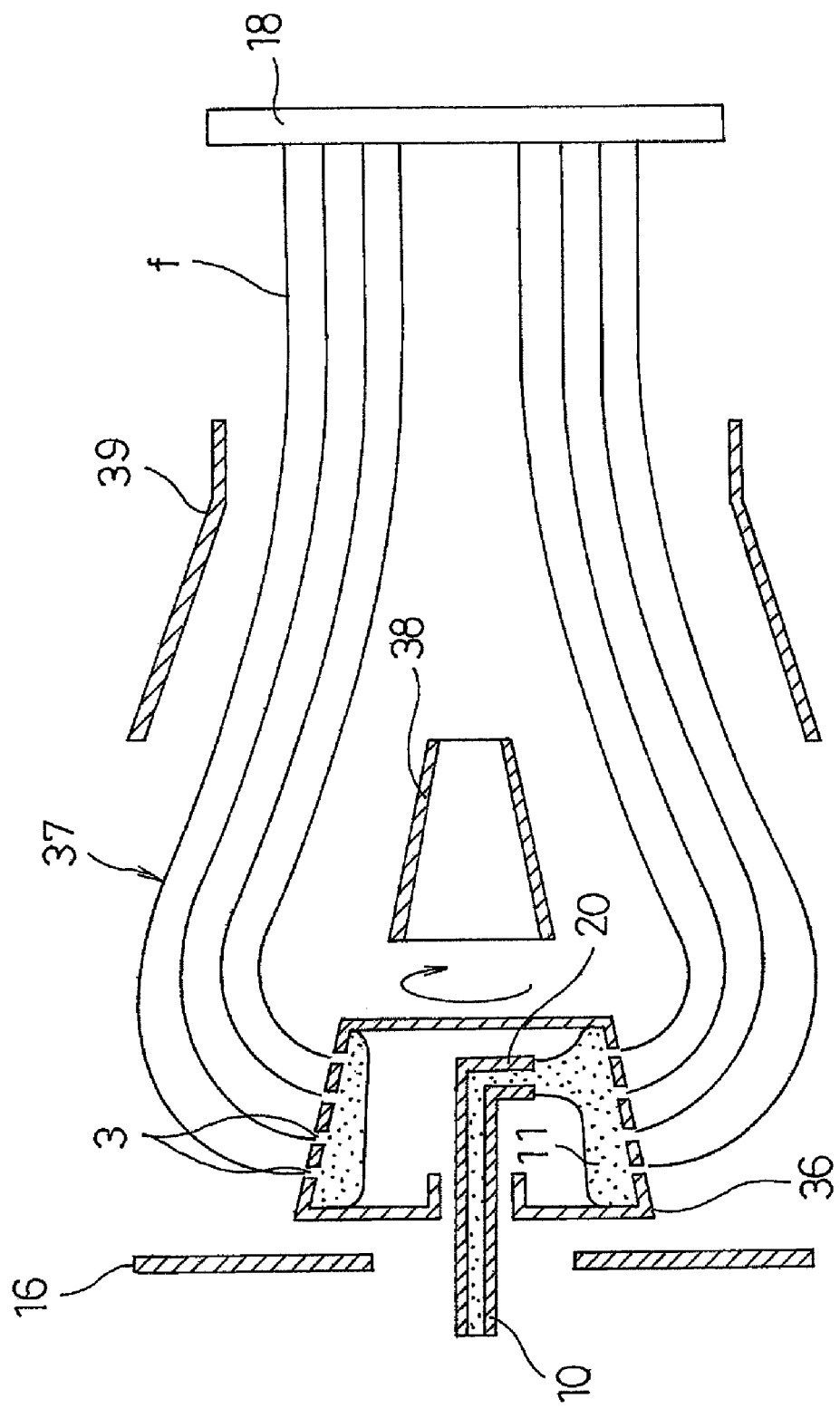

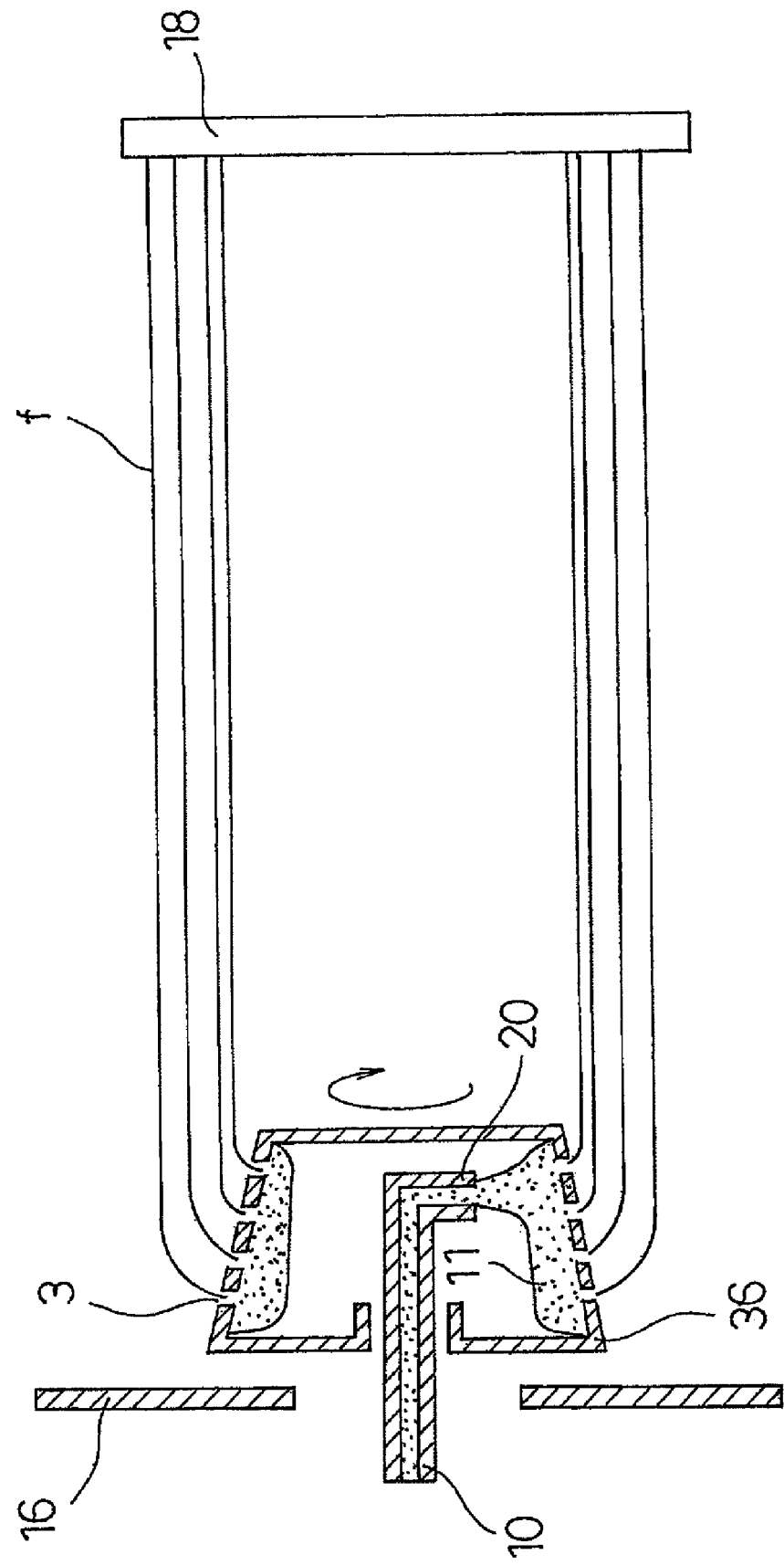

Fig. 17
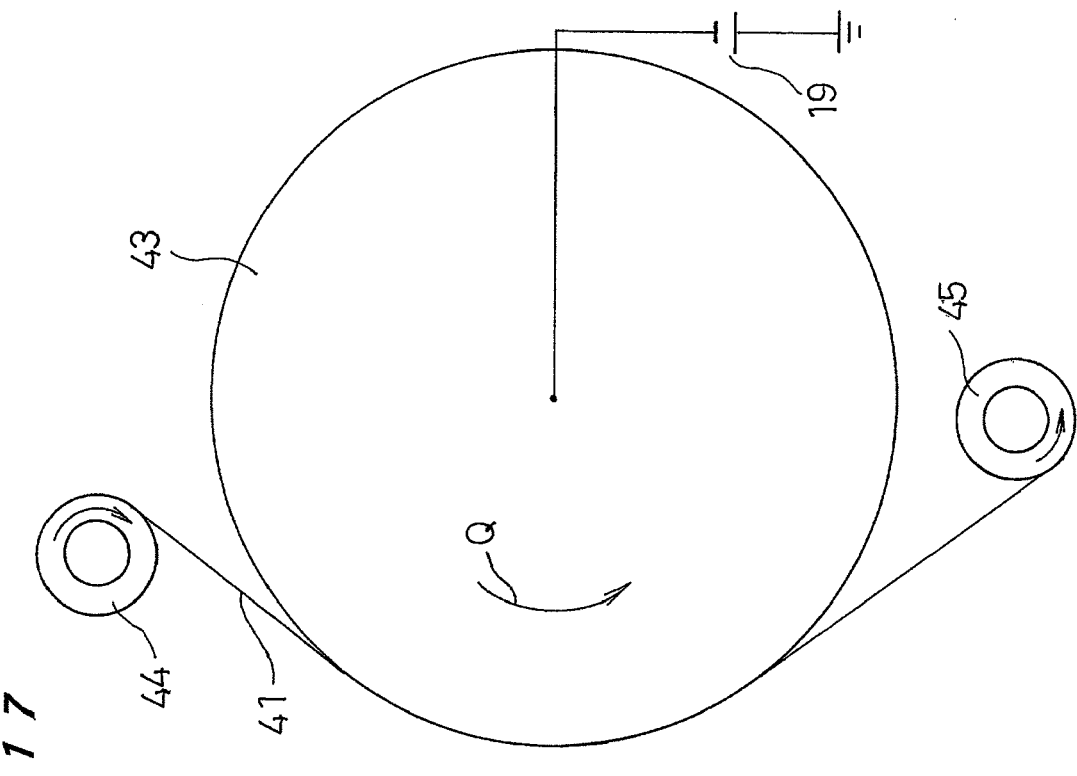
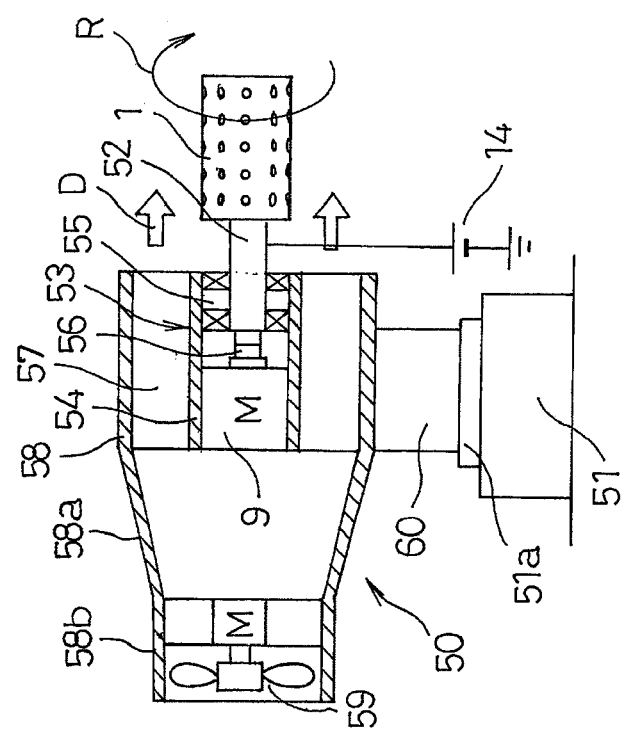

PRIOR ART

PRIOR ART

//METHOD AND APPARATUS FOR PRODUCING NANOFIBERS AND POLYMER WEB

TECHNICAL FIELD

The present invention relates to a method and an apparatus for producing nanofibers formed from a polymer material and a highly porous polymer web obtained by depositing those nanofibers.

BACKGROUND ART

Conventionally, electrospinning (electric charge induced spinning) is known as a method for producing nanofibers formed from a polymer material which have a diameter in the order of submicrons. In conventional electrospinning, a polymer solution is supplied to a needle-like nozzle to which a high voltage is applied so that the polymer solution discharged as filaments from this needle-like nozzle is electrically charged. As the solvent of the polymer solution evaporates, the distance between these electric charges decreases, and the Coulomb force acting thereon increases. When this Coulomb force exceeds the surface tension of the filamentous polymer solution, the filamentous polymer solution is explosively drawn. This phenomenon, which is called electrostatic explosion, repeats as primary, secondary, and sometimes tertiary explosions and so on. As a result, nanofibers formed from a polymer with a diameter in the order of submicrons are produced.

By depositing the thus-produced nanofibers on a substrate that is electrically grounded, a thin film having 3-D structure of a 3-D mesh can be obtained, and by forming this film more thickly, a highly porous web having a submicron mesh can be produced. The thus-produced highly porous web can be preferably used as a filter, a battery separator, a polymer electrolyte membrane or an electrode for a fuel cell or the like. Application of the highly porous web made of these nanofibers is expected to dramatically improve the performance of those devices.

However, in conventional electrospinning, only one to a few nanofibers can be produced from the tip of a single nozzle. Therefore, productivity when trying to produce a highly porous polymer web does not improve, and thus such a polymer web could not be realized. Consequently, for example, as a method for producing a polymer web by producing a large amount of nanofibers, a method using a plurality of nozzles has been proposed (see Patent Document 1).

The configuration of the polymer web production apparatus described in Patent Document 1 will now be described with reference to FIG. 21. A liquid polymer material in a barrel 83 is fed to a spinning unit 82 having a plurality of nozzles 81 by a pump 84. A high voltage of from 5 to 50 kV is applied to the nozzles 81 by a high-voltage generation unit 85. Fibers discharged from the nozzles 81 are deposited on a collector 86 that is either grounded or charged with a polarity different to that of the nozzles 81 to form a web. The formed web is transported by the collector 86, whereby the polymer web is produced. Patent Document 1 also describes that a charge distributor 87 is arranged near the tips of the nozzles 81 to minimize electrical interference among the nozzles 81, and that a high voltage is applied between the charge distributor 87 and the collector 86 so that an electric field which urges the charged fibers towards the collector 86 is created.

Furthermore, as illustrated in FIGS. 22A and 22B, Patent Document 1 also describes that instead of providing a plurality of single nozzles, a plurality of multi-nozzles 81A, each including a plurality of nozzles 81 so that a plurality of nanofibers is produced from each of the multi-nozzles 81A.

Patent Document 1: Japanese Patent Application Laid-Open No. 2002-201559

DISCLOSURE OF THE INVENTION

Problems to be Solved by the Invention

However, to produce a polymer web with dramatically improved productivity with the configuration illustrated in FIGS. 21, 22A, and FIG. 22B, if the nozzles 81 in the spinning unit 82 or the nozzles 81 in each multi-nozzle 81A are arranged at smaller intervals so that the number of nozzles per unit area is increased, as illustrated in FIG. 23, the polymer materials discharged from respective nozzles 81 repel each other as shown by arrows G, since the polymer material is charged with the same polarity. Consequently, the discharge of the material from the nozzles 81 located in the middle is hampered. In addition, the discharge of the material from the nozzles 81 located at a peripheral portion is directed outward. As a result, the deposition distribution of nanofibers on the collector 86 becomes extremely sparse at the central portion and concentrated at the peripheral portion. There is thus the problem that a uniform polymer web cannot be produced.

If the charge distributor 87 is arranged near the tips of the nozzles 81, as illustrated in FIG. 24, electrical interference among the nozzles 81 is reduced. In addition, an effect is obtained in which the polymer material discharged from each of the nozzles 81 is accelerated toward the collector 86 because of the formation of an electric field E from the charge distributor 87 toward the collector 86. As a result, compared with the case of FIG. 23, the deposition distribution of nanofibers at the central portion and at the peripheral portion can be made uniform to a certain extent. However, at the same time, the arrangement pattern of the nozzles 81 is directly reflected in the deposition distribution. Therefore, there is the problem that the above-described arrangement is not sufficiently effective to obtain a uniform deposition distribution.

Furthermore, if the arrangement density of the nozzles 81 is raised, fibers may come into contact with each other and stick together without sufficient evaporation of the solvent. In addition, the concentration of the evaporated solvent may become high in the vicinity of the nozzles, so that the insulation properties weaken. As a result, corona discharge may occur, so that there is the problem that fibers may not be formed.

Furthermore, if multiple nozzles 81 are arranged, it is difficult to supply the liquid polymer material uniformly to each of the nozzles 81, which can lead to problems such as a more complicated apparatus configuration and more expensive equipment costs. In addition, to initiate an electrostatic explosion in the liquid polymer material discharged from the nozzles 81, the electric charge needs to be concentrated, and, accordingly, each of the nozzles 81 is formed in an elongated shape. However, there is the problem that it is extremely difficult to carry out maintenance on multiple elongated nozzles 81 to ensure that they are constantly in the proper condition.

The present invention solves the problems in the above-described conventional art. It is an object of the present invention to provide a method and an apparatus for producing nanofibers, and a polymer web using these nanofibers, which can be produced uniformly by a simple configuration with good productivity.

Means for Solving the Problems

A method for producing nanofibers of the present invention includes a nanofiber production step of producing nanofibers formed from a polymer material, by rotating a conductive rotating container having a plurality of small holes while supplying a polymer solution formed by dissolving a polymer material in a solvent into the rotating container, electrically charging the polymer solution discharged from the small holes of the rotating container, and drawing the discharged filamentous polymer solution by centrifugal force and an electrostatic explosion resulting from evaporation of the solvent, and an orientation and flowing step of orienting and making the nanofibers from the production step flow from one side toward the other side in a shaft center direction of the rotating container.

According to this configuration, when the polymer solution is electrically charged and discharged from the plurality of small holes of the rotating container, initially the polymer solution is drawn by the action of centrifugal force. Thus, unlike drawing from the start by only an electrostatic explosion, an elongated nozzle for electrically charging the polymer solution is not necessary. Furthermore, since the small holes are not easily affected by electric field interference because the polymer solution is radially discharged, the filamentous polymer solution can be reliably and effectively drawn even if the small holes are arranged in a high density. Subsequently, the filamentous polymer solution is drawn by the action of centrifugal force, which narrows the diameter of the filaments, and the solvent evaporates, which causes the electric charge to concentrate. When this concentrated Coulomb force exceeds the surface tension, the filamentous polymer solution is explosively drawn due to the occurrence of a primary electrostatic explosion. Subsequently, more of the solvent evaporates and a secondary electrostatic explosion similarly occurs, whereby the filamentous polymer solution is explosively drawn. Sometimes, a tertiary electrostatic explosion occurs, so that the filamentous polymer solution discharged from the plurality of small holes is drawn, thereby producing a polymer material having a diameter in the order of submicrons, whereby nanofibers formed from the polymer material can be efficiently produced. Furthermore, after being drawn in the above manner by the action of centrifugal force, those filaments which are radially spreading out on their own accord are oriented and made to flow in the shaft center direction of the rotating container. Thus, the produced nanofibers can be easily collected within a desired range. In addition, even if droplets and the like are produced which have not formed into a fiber, such droplets fly toward the periphery by centrifugal force as is, so that only suitable nanofibers orient and flow. This allows only good quality nanofibers to be collected. Furthermore, as described above, since the small holes can be arranged in a high density, a large amount of nanofibers can be efficiently produced by a simple and compact configuration. In addition, since the polymer solution discharged from the small holes is initially drawn by centrifugal force, the small holes do not have to be made extremely small, and because the polymer solution is electrically charged in the above-described manner, long nozzles do not have to be provided. Thus, it is sufficient to provide nozzle members having a small length dimension or small holes in the rotating container, which allows the nanofibers to be produced easily and inexpensively. Furthermore, maintenance is also simple even if a large number of small holes are provided.

Furthermore, the orientation and flowing step is preferably carried out by applying a voltage with the same polarity as the electric charge of the polymer solution to a reflecting electrode arranged on the one side in the shaft center direction of the rotating container, and/or by blowing the nanofibers from the one side in the shaft center direction of the rotating container so as to orient and make the nanofibers flow. By arranging the reflecting electrode on the one side which does not face the flow direction of the charged polymer solution, there is no risk of the flow of the polymer solution being hindered by the electric charge of the reflecting electrode, so that the nanofibers can be produced stably and efficiently. Furthermore, if the nanofibers are oriented and made to flow by blowing, the nanofibers from the production step can be oriented and made to flow more effectively by riding on the flow of air. In addition, the evaporated solvent is rapidly discharged due to the flow of air, so that the solvent concentration in the surrounding atmosphere does not become high. This allows the evaporation of the solvent to occur smoothly, so that the electrostatic explosion action can be reliably obtained, and the desired nanofibers can be reliably produced.

Furthermore, it is preferred that the rotating container is a cylindrical container having the plurality of small holes on its peripheral surface which rotates around a shaft center, or a tubular container on which the small holes are arranged so that their rotation diameters decrease moving from the one side to the other side in the shaft center direction. If the rotating container is a cylindrical container, a large amount of nanofibers can be uniformly produced at a time from the whole periphery, so that a high productivity can be secured, and since the shape and structure are simple, equipment costs can be reduced. Furthermore, if the rotating container is a tubular container in which the small holes are arranged so that their rotation diameter decreases moving from the one side to the other side in the shaft center direction, due to the difference in the centrifugal force received by the polymer solution discharged from the respective small holes, the nanofibers formed by the small holes on the one side flow toward an outer position away in the radial direction, and the nanofibers formed by the small holes on the other side flow toward an inner position on the other side in the radial direction. Thus, the nanofibers discharged from the respective sides do not overlap, so that a flow region cross-sectional shape of the nanofibers can be made to approximate a circle rather than a narrow-width doughnut shape.

Furthermore, to focus the cross-sectional shape of the flow region of the nanofibers from a doughnut shape into an arbitrary cross-sectional shape, such as a shape in which the center hollow portion becomes smaller or a rectangle, the tubular flow region of the nanofibers may be focused by a focusing electrode arranged on at least a shaft center portion and a periphery portion of the tubular flow region of the nanofibers on the other side of the shaft center direction of the rotating container. In this case, a voltage of the same or different polarity which is lower than that of the rotating container is applied to the focusing electrode arranged on the shaft center portion, and a voltage of the same polarity as the rotating container is applied to the focusing electrode arranged on the periphery portion.

Furthermore, during the nanofiber production step, it is preferred to contain a roughly constant amount of the polymer solution in the rotating container. By doing this, the centrifugal force acting on the polymer solution extruded from the small holes of the rotating container is constant, and the polymer solution can be uniformly discharged in a filamentous state, so that the nanofibers can be uniformly produced in the shaft center direction of the cylindrical container.

Furthermore, one method to make the amount of the contained polymer solution constant is to detect the amount of the polymer solution contained in the rotating container, and control the supply amount of the polymer solution into the rotating container so that a roughly constant amount of the polymer solution is contained in the rotating container.

Furthermore, the rotation speed of the rotating container can be controlled based on the viscosity of the polymer solution contained in the rotating container. By doing this, the required centrifugal force can be made to act on the polymer solution based on the viscosity of the polymer solution without changing the rotating container, so that the nanofibers can be reliably and efficiently produced. Furthermore, the radial distance between the rotating shaft center and the small holes of the rotating container can be determined based on the viscosity of the polymer solution contained in the rotating container. By doing this, the required centrifugal force can be made to act on the polymer solution based on the viscosity of the polymer solution without drastically changing the rotation speed of the rotating container, so that the nanofibers can be reliably and efficiently produced.

Furthermore, it is preferred to arrange a ring electrode so as to enclose the periphery of the rotating container, electrically charge the polymer solution discharged from the rotating container by generating an electric field between the ring electrode and the rotating container, and orient and make the nanofibers from the production step flow so as to be discharged from a spinning space between the rotating container and the ring electrode. By doing this, a uniform and strong charge can be imparted to the polymer solution discharged by the action of a uniform and strong electric field which is generated in the spinning space located between the rotating container and the ring electrode, which is arranged roughly opposite and at about an equal distance to the periphery of the rotating container. In addition, since the nanofibers from the production step are then immediately discharged from the spinning space, there is no need to set a large distance required to repeat the electrostatic explosion between the rotating container and the ring electrode, and the required strong electric field can be generated without applying an extremely high voltage to the space therebetween. As a result, a large amount of nanofibers can be efficiently produced. Moreover, a large amount of nanofibers can be efficiently produced by a simple and compact configuration. Here, the ring electrode may be configured by a cylinder, a mesh-like ring body, a filamentous ring body and the like, formed from a conductive member.

Furthermore, the production method of a polymer web of the present invention includes the steps of: producing nanofibers by the above-described method for producing nanofibers; and applying a voltage having a difference in potential with respect to the charge of the nanofibers on a conductive collector arranged to the rotating container with an interval provided in the other side of the shaft center direction, or grounding the collector to deposit the generated nanofibers on the collector. Furthermore, the deposition of the nanofibers onto the collector may be carried out by directly depositing onto the collector, by depositing onto a member arranged on the collector or a sheet material which moves above the collector, or by providing a function for successively transporting the polymer web which has deposited on the collector.

According to the above configuration, a high porous polymer web can be produced with good productivity by moving the nanofibers, which have thus been produced in a large amount in an electrically-charged state, toward the collector due to the action of the electric field, and efficiently depositing the nanofibers on the collector. If a sheet material is moved over the collector at a predetermined speed, a sheet on which the polymer web is formed with a predetermined thickness can be continuously produced.

Furthermore, if the nanofiber production unit, which produces the nanofibers and discharges them towards the collector, is reciprocally moved relative in a direction parallel to at least one side of the collector or in a direction orthogonal to the movement direction of a sheet material moving on the collector, the nanofibers can be uniformly deposited in one production step over the whole surface of the collector having a broad surface area or the wide sheet material. As a result, a polymer web having a large surface area can be produced with good productivity using a nanofiber production unit with a compact structure.

Furthermore, the production apparatus of the nanofibers of the present invention includes: a conductive rotating container which is rotatably supported and which has a plurality of small holes with a distance provided from a rotating shaft center in a radial direction; polymer solution supply means for supplying into the rotating container a polymer solution in which a polymer material is dissolved in a solvent; rotation drive means for rotatably driving the rotating container; charging means for imparting an electric charge to the polymer solution discharged from the small holes of the rotating container; orientation and flow means, which is arranged on one side in a shaft center direction of the rotating container, for orienting and making charged nanofibers produced from the polymer solution discharged from the small holes of the rotating container flow toward the other side in the shaft center direction of the rotating container; and a control unit for controlling the polymer solution supply means, the rotation drive means, the charging means, and the orientation and flow means. The advantageous effects of the above-described method for producing nanofibers can be enjoyed by performing such method. Furthermore, the charging means may be configured by a high-voltage generation means which applies a high voltage to the rotating container, or which applies a high voltage to a member, such as the collector for the nanofibers, which is arranged with an interval with respect to the rotating container so that an electric field is generated between the rotating container and the member.

Furthermore, the orientation and flow means preferably has a reflecting electrode applied with a voltage with the same polarity as the electric charge of the polymer solution discharged from the small holes of the rotating container, and/or blowing means for blowing the nanofibers from the one side to the other side in the shaft center direction of the rotating container. If the orientation and flow means has the reflecting electrode, the nanofibers charged with a charge by the reflecting electrode can be reliably oriented and made to flow, and there is no risk of the flow of the polymer solution being hindered by the charge of the reflecting electrode, so that the nanofibers can be produced stably and efficiently. Furthermore, if the orientation and flow means has blowing means, the nanofibers from the production step can be oriented and made to flow more effectively by being ridden on the flow of air. In addition, the evaporated solvent is rapidly discharged due to the flow of air, so that the solvent concentration in the surrounding atmosphere does not become high. This allows the evaporation of the solvent to occur smoothly, so that the electrostatic explosion action can be reliably obtained, and the desired nanofibers can be reliably produced.

Furthermore, it is preferred that the rotating container is configured by a cylindrical container having the plurality of small holes on its peripheral surface, or a tubular container on which the small holes are arranged so that their rotation diameters decrease moving from one side to the other side in a shaft center direction of the rotating container. If the rotating container is configured by a cylindrical container, a large amount of nanofibers can be uniformly produced at a time from the whole periphery, so that a high productivity can be secured, and since the shape and structure are simple, equipment costs can be reduced. Furthermore, if the rotating container is configured by the above-described tubular container, due to the difference in the centrifugal force received by the polymer solution discharged from the respective small holes, the nanofibers formed by the small holes on the one side flow toward an outer position away in the radial direction, and the nanofibers formed by the small holes on the other side flow toward an inner position on the other side in the radial direction. Thus, the nanofibers discharged from the respective sides do not overlap, so that a flow region cross-sectional shape of the nanofibers can be made to approximate a circle rather than a narrow-width doughnut shape.

Furthermore, to focus the cross-sectional shape of the flow region of the nanofibers from a doughnut shape into an arbitrary cross-sectional shape, such as a shape in which the center hollow portion become smaller or a rectangular cross-section, a focusing electrode for focusing the tubular flow region of the nanofibers may be arranged on at least a shaft center portion and a periphery portion of the tubular flow region of the nanofibers on the other side of the shaft center direction of the rotating container, applying a voltage of the same or different polarity which is lower than that of the rotating container to the focusing electrode arranged on the shaft center portion, and applying a voltage of the same polarity as the rotating container is applied to the focusing electrode arranged on the periphery portion.

Furthermore, a supply tube for supplying the polymer solution may be inserted from a shaft center aperture portion on one end of the cylindrical container, and the tip of this supply tube may be formed in a roughly L-shape in the cylindrical container. By doing this, the polymer solution can be supplied into the rotating container without the risk of the polymerization solution leaking from the shaft center aperture portion on one end of the cylindrical container, even if the orientation of the cylindrical container is arbitrarily changed so that the flow direction of the produced nanofibers is not only a horizontal direction, but is downwards or upwards.

Furthermore, means for controlling the amount of the polymer solution contained in the rotating container at a constant level may be provided. By doing this, the centrifugal force acting on the polymer solution extruded from the small holes of the rotating container is constant, and the polymer solution can be uniformly discharged in a filamentous state, so that the uniform nanofibers can be produced. One example of such means for controlling the amount of the polymer solution in the rotating container at a constant level is a configuration which includes contained amount detection means for detecting the amount of the polymer solution contained in the rotating container, and supply control means for controlling the polymer solution supply means based on the detected contained amount.

Furthermore, it is preferred to arrange a ring electrode so as to enclose the periphery of the rotating container, and to provide high-voltage generation means for applying a high voltage to between the rotating container and the ring electrode. By doing this, as described above, a uniform and strong charge can be imparted to the polymer solution discharged by the action of a uniform and strong electric field which is generated between the rotating container and the ring electrode. In addition, since the nanofibers from the production step are then immediately discharged from the spinning space, there is no need to set a large distance required to repeat the electrostatic explosion between the rotating container and the ring electrode, and the required strong electric field can be generated without applying an extremely high voltage between the rotating container and the ring electrode. As a result, a large amount of nanofibers can be efficiently produced.

Furthermore, the above-described nanofiber production apparatus is applied to the production apparatus of a polymer web of the present invention which includes a conductive collector which is arranged to the rotating container with an interval provided on the other side in the shaft center direction, and which is applied with a voltage having a difference in potential with respect to the electric charge of the nanofibers or is grounded, wherein the thus-produced nanofibers are deposited on the collector so that polymer web can be efficiently produced.

Furthermore, sheet material moving means for moving a sheet material on which the nanofibers are adhered and deposited over the collector at a predetermined speed may also be provided. By doing so, a sheet on which the polymer web is formed with a predetermined thickness can be continuously produced.

Furthermore, the nanofiber production apparatus, in which the nanofibers are produced and flowed toward the collector, may also be provided with deposition moving means for reciprocally moving relative in a direction parallel to at least one side of the collector or in a direction orthogonal to the movement direction of the sheet material. As a result, the nanofibers can be uniformly deposited in one production step over the whole surface of the collector having a broad surface area or the wide sheet material. As a result, a polymer web having a large surface area can be produced with good productivity using a nanofiber production unit with a compact structure.

BRIEF DESCRIPTION OF THE DRAWINGS

FIGS. 8A and 8B illustrate a rotating plate in the same embodiment, in which FIG. 8A is a side view thereof and FIG. 8B is a front view thereof.

FIGS. 9A and 9B illustrate rotation detection means in the same embodiment, in which FIG. 9A is a front view of the detection plate and FIG. 9B is a side view of the rotation detection means.

FIG. 10 is a diagram illustrating a control operation of a polymer solution amount in the same embodiment.

FIG. 11 is a perspective view of the polymer web production apparatus of Embodiment 3 of the present invention.

FIG. 12 is a longitudinal front view illustrating a schematic configuration of the polymer web production apparatus of Embodiment 4 of the present invention.

FIG. 13 is a longitudinal front view illustrating a modified configuration example of the same embodiment.

FIG. 17 is a schematic configuration diagram of a more preferred configuration example in the same embodiment.

FIGS. 22A and 22B illustrate the main structures of another configuration example of the same conventional example, in which FIG. 22A is a front view and FIG. 22B is a partial expanded bottom view.

BEST MODE FOR CARRYING OUT THE INVENTION

Various embodiments of the production method and apparatus of the nanofibers and polymer web of the present invention will now be described with reference to FIGS. 1 to 20.

Embodiment 1

First, Embodiment 1 of the production apparatus of the polymer web of the present invention will be described with reference to FIGS. 1 to 6C.

Figure 1:
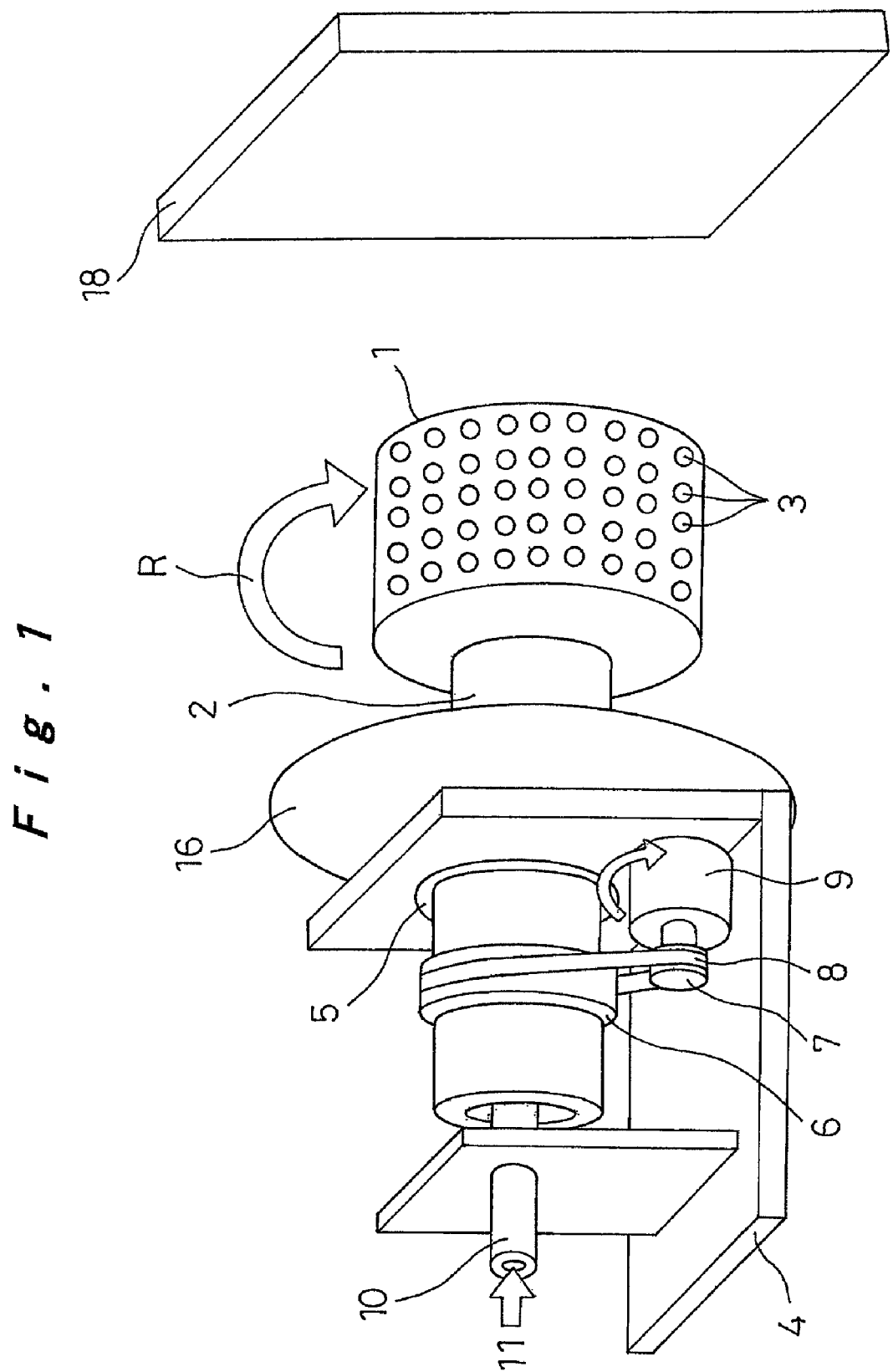
FIG. 1 is a perspective view of a polymer web production apparatus of Embodiment 1 of the present invention.
Figure 2:
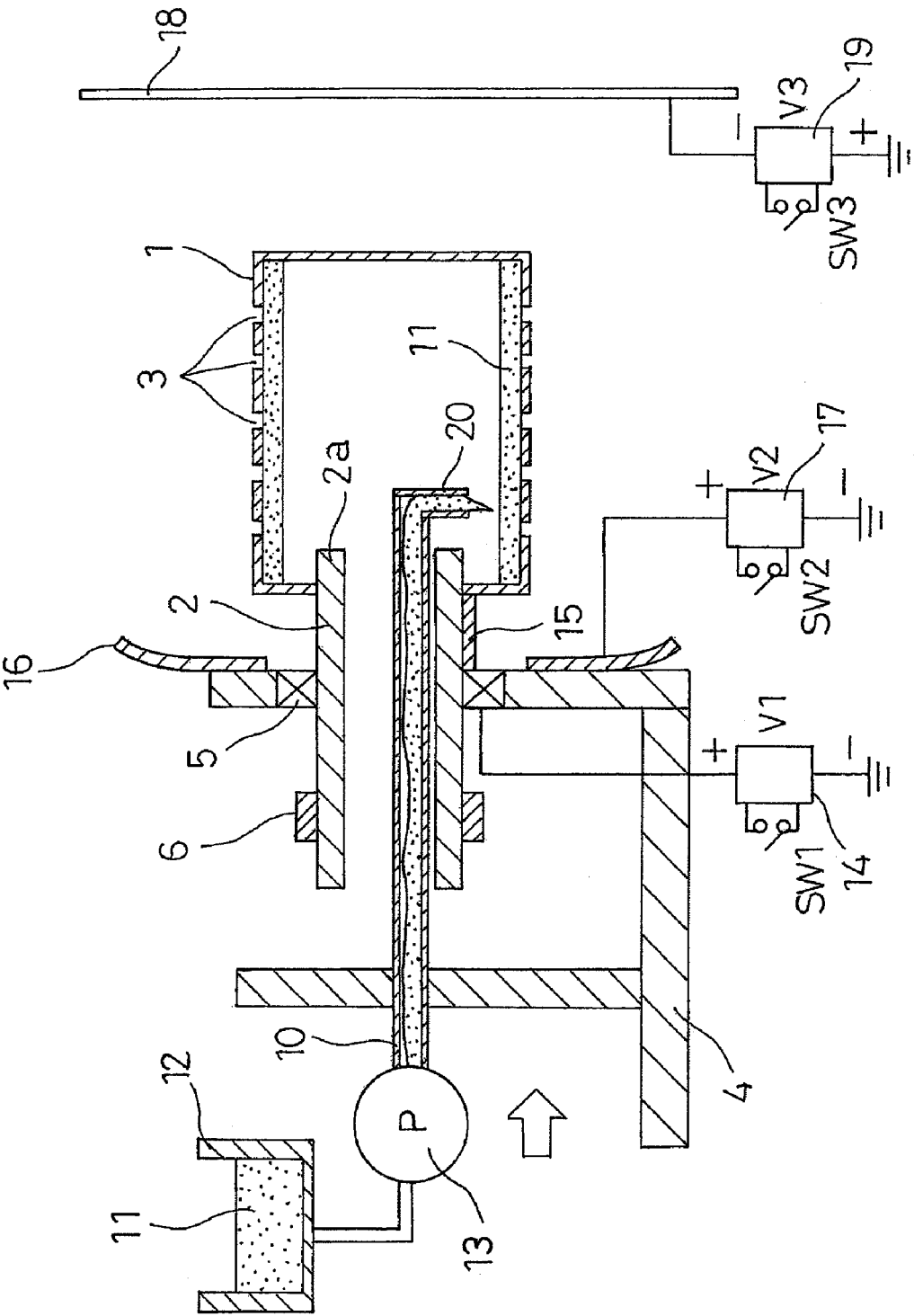
FIG. 2 is a longitudinal front view of the polymer web production apparatus of the same embodiment.
Figure 3:
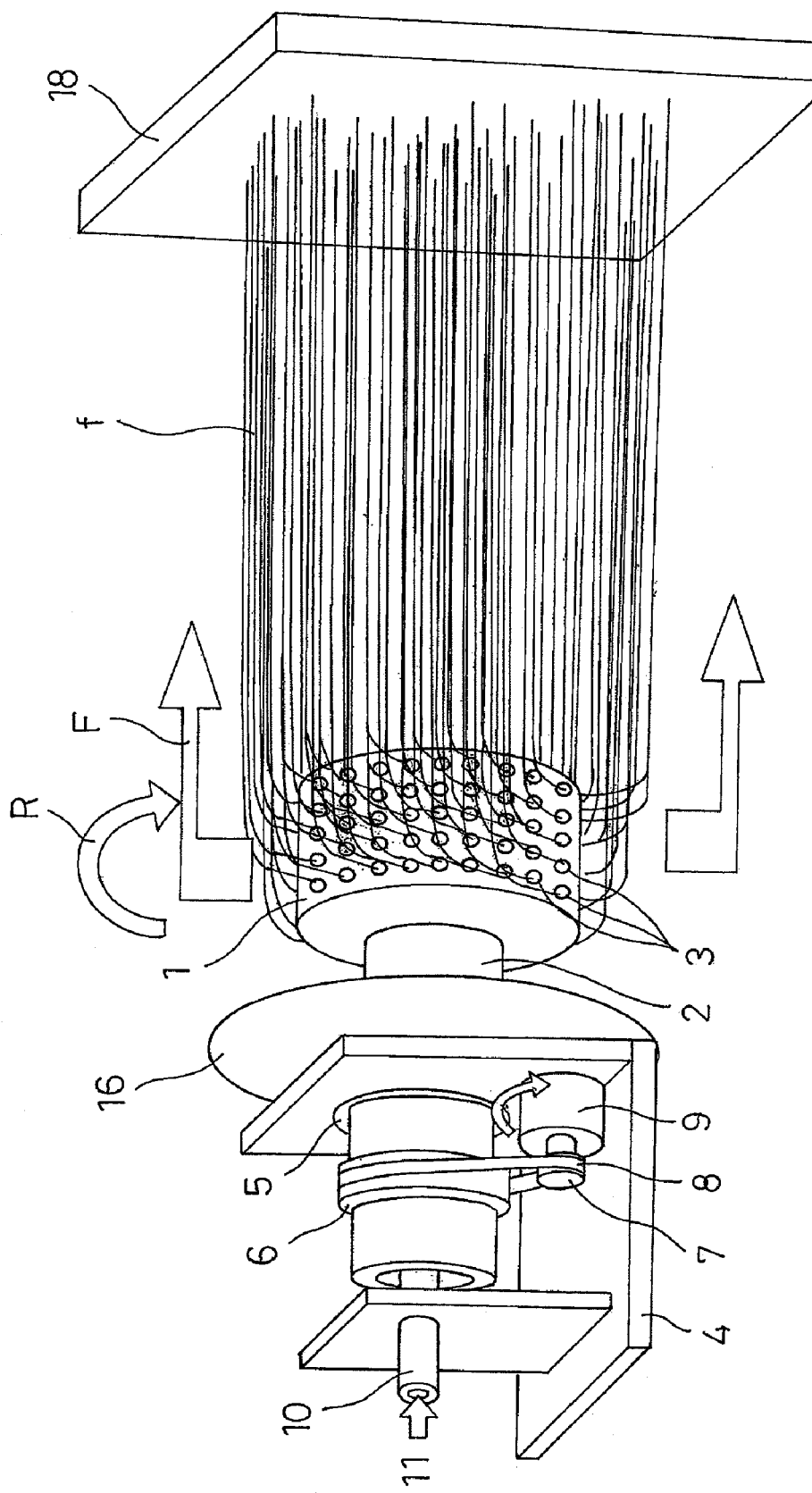
FIG. 3 is a perspective view illustrating a production state of the polymer web of the same embodiment.

In FIGS. 1 to 3, reference numeral 1 denotes a cylindrical container with a diameter of 20 to 500 mm as a rotating container. The end of a rotating cylinder 2 passes through the shaft center of one end of the cylindrical container 1. The cylindrical container 1 is thus integrally fixed so as to be rotatably supported in the direction of arrow R around the shaft center by the rotating cylinder 2. The rotating cylinder 2 is formed from a material having high electrical insulation properties. The other end of the cylindrical container 1 is closed, and multiple small holes 3 with a diameter of about 0.01 to 2 mm are formed on a peripheral surface at a pitch distance of a few mm. The small holes 3 may be formed by holes which are directly open to the peripheral wall of the cylindrical container 1, or may be formed by a nozzle member with short dimensions mounted on the peripheral wall. The rotating cylinder 2 is rotatably supported via a bearing 5 by a support frame 4 formed from a material having high electrical insulation properties. Furthermore, the rotating cylinder 2 is rotatably driven at a rotation speed of several hundred to ten thousand rpm by a motor 9 as rotation drive means via a belt 8 wound between a pulley 6 arranged on the peripheral surface of the rotating cylinder 2 and a pulley 7 arranged on an output shaft of the motor 9. As the motor 9, since there is a risk of faulty operation due to a sensor being influenced by high-pressure noise, it is preferred to use a sensor-less DC motor.

A polymer solution 11, in which a polymer material, which is the material of the nanofibers, is dissolved in a solvent, is supplied to the cylindrical container 1 via a solution supply tube 10 which passes through the rotating cylinder 2 and is inserted into the cylindrical container 1. The tip of the solution supply tube 10 is formed from an L-shaped curved portion 20. This tip is positioned on a radial direction outer side from the periphery of an insertion tip 2a of the rotating cylinder 2 protruding into the cylindrical container 1. The polymer solution 11 is fed at a predetermined flow rate towards the solution supply tube 10 by a supply pump 13 as polymer solution supply means from a reservoir container 12. Generally, the amount of the solvent is a ratio of about 60% to 98%. This ratio changes depending on the kind of used polymer solution, the diameter of the produced nanofibers and the like. Preferably, the ratio of solvent is about 80% to 95%.

Preferred examples of the polymer material which can be used to form the polymer solution 11 include, but are not limited to, one or more selected from polypropylene, polyethylene, polystyrene, polyethylene oxide, polyethylene terephthalate, polybutylene terephthalate, polyethylene naphthalate, poly m-phenylene terephthalate, poly-p-phenylene isophthalate, polyvinylidene fluoride, polyvinylidene fluoride-hexafluoropropylene copolymer, polyvinyl chloride, polyvinylidene chloride-acrylate copolymer, polyacrylonitrile, a polyacrylonitrile-methacrylate copolymer, polycarbonate, polyarylate, polyester carbonate, nylon, an aramid, a polycaprolactone, polylactic acid, polyglycolic acid, collagen, polyhydroxybutanoic acid, polyvinyl acetate, polypeptide and the like, as well as biological macromolecules such as nucleic acid and proteins.

Examples of the solvent which can be used include, but are not limited to, one or more selected from methanol, ethanol, 1-propanol, 2-propanol, hexafluoro isopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, a tetrahydrofuran, N,N-dimethylformamide, pyridine, water and the like.

An inorganic solid material may also be mixed in the polymer solution 11. Examples of such inorganic solid materials include oxides, carbides, nitrides, borides, silicides, fluorides, sulfides and the like. From the perspective of heat resistance, processability and the like, it is preferred to use an oxide. Examples of oxides which may be used include, but are not limited to, at least one kind selected from $Al_2O_3$, $SiO_2$, $TiO_2$, $Li_2O$, $Na_2O$, $MgO$, $CaO$, $SrO$, $BaO$, $B_2O_3$, $P_2O_5$, $SnO_2$, $ZrO_2$, $K_2O$, $Cs_2O$, $ZnO$, $Sb_2O_3$, $As_2O_3$, $CeO_2$, $V_2O_5$, $Cr_2O_3$, $MnO$, $Fe_2O_3$, $CoO$, $NiO$, $Y_2O_3$, $Lu_2O_3$, $Yb_2O_3HfO_2$, and $Nb_2O_5$.

The cylindrical container 1 is configured so that a high voltage of 1 kV to 100 kV, and preferably 10 kV to 100 kV, generated by first high-voltage generation means 14 is applied thereto via the bearing 5 and the a conductive member 15, to electrically charge the polymer solution 11 which is contained therein. If the cylindrical container 1 is rotationally driven at a high speed by the motor 9, a centrifugal force acts on the electrically charged polymer solution 11, whereby the polymer solution 11 is discharged from the respective small holes 3 in a filamentous state. Furthermore, fine polymer filaments are produced due to being drawn by the action of centrifugal force and the diameter of these polymer filaments becomes finer due to the evaporation of the solvent. In conjunction with this, when the Coulomb force of the concentrated electric charge exceeds the surface tension of the polymer solution, the polymer filaments are explosively drawn due to the occurrence of a primary electrostatic explosion. Subsequently, more of the solvent evaporates and a secondary electrostatic explosion similarly occurs, whereby the polymer filaments are explosively drawn. Sometimes, nanofibers formed from the polymer material having a diameter in the order of submicrons are efficiently produced due to being drawn as a result of the occurrence of a tertiary electrostatic explosion.

A reflecting electrode 16 is arranged on the support frame 4 so as to face one side of the cylindrical container 1 with a suitable interval provided therebetween. A high voltage generated by second high-voltage generation means 17 is applied to this reflecting electrode 16. This second high-voltage generation means 17 is configured to generate a high voltage with the same polarity and having approximately the same level as those of the first high-voltage generation means 14 to apply it to the reflecting electrode 16. As illustrated in FIG. 3, the second high-voltage generation means 17 is also configured such that the polymer filaments produced by being discharged and drawn from the cylindrical container 1 by the reflecting electrode 16 and the nanofibers f which are subsequently produced by electrostatic explosion flow towards the other side of the cylindrical container 1, as shown by arrow F.

On the other side of the cylindrical container 1, a conductive collector 18 is arranged so as to face the cylindrical container 1 with a suitable gap provided therebetween. A high voltage generated by a third high-voltage generation means 19 is applied to this collector 18. This high voltage has the reverse polarity to the voltage applied to the cylindrical container 1. As illustrated in FIG. 3, due to the large difference in potential between the cylindrical container 1 and reflecting electrode 16 with the collector 18, the charged nanofibers f are moved toward the collector 18, and are deposited on the collector 18. By applying on the collector 18 a high voltage having the reverse polarity to that of the cylindrical container 1, the produced nanofibers f can be deposited on the collector 18 even if the cylindrical container 1 and the collector 18 are separated by a distance of, for example, about 2 m. Furthermore, it is preferred that the first to third high-voltage generation means 14, 17, and 19 can be freely switched on and off as necessary by switches SW1, SW2, and SW3.

Furthermore, since it is sufficient to just create a large difference in potential between the cylindrical container 1 and reflecting electrode 16 with the collector 18, the collector 18 can simply be grounded. Furthermore, conversely, in cases where the positive or negative high voltage is applied by the third high-voltage generation means 19 to the collector 18, the cylindrical container 1 can simply be electrically grounded. In such a case, the polymer solution 11 flowing from the small holes 3 of the cylindrical container 1 by the electric field generated between the cylindrical container 1 and the collector 18 will be charged with the reverse polarity from that of the collector 18.

Figure 4:
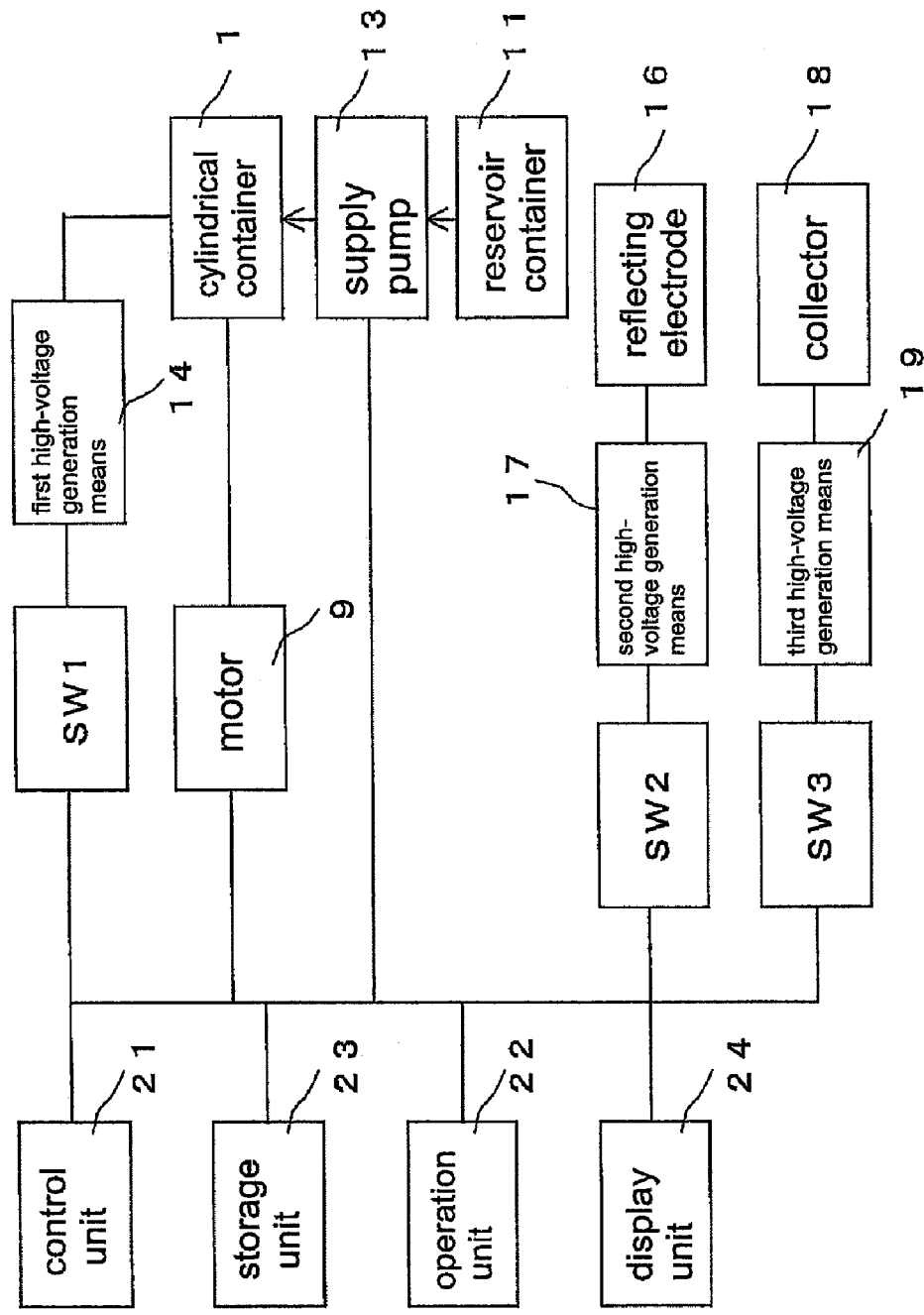
FIG. 4 is a block diagram illustrating a control configuration of the same embodiment.

Next, a control configuration will be described with reference to FIG. 4. In FIG. 4, the motor 9, a supply pump 13, and the first to third high-voltage generation means 14, 17, and 19 are controlled by a control unit 21. The control unit 21 carries out operations and controls based on an operation program stored in a storage unit 23 and on various stored pieces of data input from an operation unit 22 according to a work command from the operation unit 22. The operating state of the control unit 21 and the various pieces of data are displayed on a display unit 24.

In the above configuration, by supplying a predetermined amount of the polymer solution 11 into the cylindrical container 1 by the supply pump 13, and applying a predetermined high voltage from the first high-voltage generation means 14 to the cylindrical container 1, the polymer solution 11 contained in the cylindrical container 1 is electrically charged. By rotating the cylindrical container 1 in this state at high speed by the motor 9, as described above, the polymer filaments formed by the electrically charged polymer solution 11 which is discharged in a filamentous state from the plurality of small holes 3 initially is largely drawn due to the action of centrifugal force. The diameter subsequently becomes finer due to further drawing, and the solvent evaporates, which causes a primary electrostatic explosion to occur. As a result, the polymer filaments are explosively drawn. Thereafter, more of the solvent evaporates, a secondary electrostatic explosion similarly occurs, and the polymer filaments are explosively drawn even further. Sometimes, the nanofibers f formed from the polymer material having a diameter in the order of submicrons are produced from the polymer solution filaments which are discharged from the plurality of small holes 3, due to being drawn as a result of the occurrence of a further tertiary electrostatic explosion and the like.

Furthermore, after the polymer solution filaments are drawn due to the action of centrifugal force when producing the above-described nanofibers f, those filaments which are radially spreading out on their own accord are oriented and made to flow in the other side direction to the shaft direction of the cylindrical container 1 by the reflecting electrode 16. Thus, the produced nanofibers f can be easily collected within a described range of the collector 18. Furthermore, since the reflecting electrode 16 is arranged on one side of the cylindrical container 1, the reflecting electrode 16 does not face the flow direction of the charged polymer solution 11 as is the case when a parabolic mirror-shaped reflecting electrode is arranged facing the peripheral surface of the cylindrical container 1. Still further, there is no risk of the discharge of the polymer solution 11 being interfered with by the charge of the reflecting electrode 16. Therefore, the nanofibers f can be produced stably and efficiently. In addition, even if droplets and the like are produced which have not formed into a fiber, such droplets fly toward the periphery by centrifugal force as is, so that only suitable nanofibers f orient and flow toward the collector 18. This allows only good quality nanofibers f to be collected. By depositing the thus-produced charged nanofibers f on the collector 18, a highly porous polymer web can be produced with a good productivity.

Here, the polymer solution filaments formed by being discharged from the small holes 3 of the cylindrical container 1 are largely drawn by the action of centrifugal force. As a result, the diameter of the small holes 3 can be about 0.01 to 2 mm. Furthermore, it is not necessary to make the small holes 3 very small, nor is it necessary to concentrate the electric charge, unlike in the case of initially generating a static explosion. Thus, the small holes 3 do not need to form an elongated nozzle. Furthermore, since the small holes 3 are not easily affected by electric field interference, the polymer solution filaments can be reliably and effectively drawn even if the small holes 3 are arranged in a high density. Therefore, a large amount of nanofibers f can be efficiently produced with a simple and compact structure. Furthermore, a large amount of nanofibers can be uniformly produced at a time from the whole periphery of the cylindrical container 1, so that a high productivity can be secured, and since the shape and structure are simple, equipment costs can be reduced. In addition, since the small holes 3 do not have to be formed with a long length, the small holes 3 can simply be provided on the peripheral wall of the cylindrical container 1, which means that the cylindrical container 1 can be produced easily and inexpensively. Furthermore, maintenance is also simple even if a large number of small holes 3 are provided.

The motor 9 is configured so that the rotation speed of the cylindrical container 1 can be controlled based on the viscosity of the polymer solution 11 which is contained in the cylindrical container 1. This allows the required centrifugal force to be made to act on the polymer solution 11 based on the viscosity of the polymer solution 11, whereby the nanofibers f can be reliably and efficiently produced. Furthermore, the diameter of the cylindrical container 1 itself may also be determined based on the viscosity of the polymer solution 11 contained therein, so that the required centrifugal force can be made to act based on the viscosity of the polymer solution 11 without drastically changing the rotation speed of the rotating container.

Figure 5:
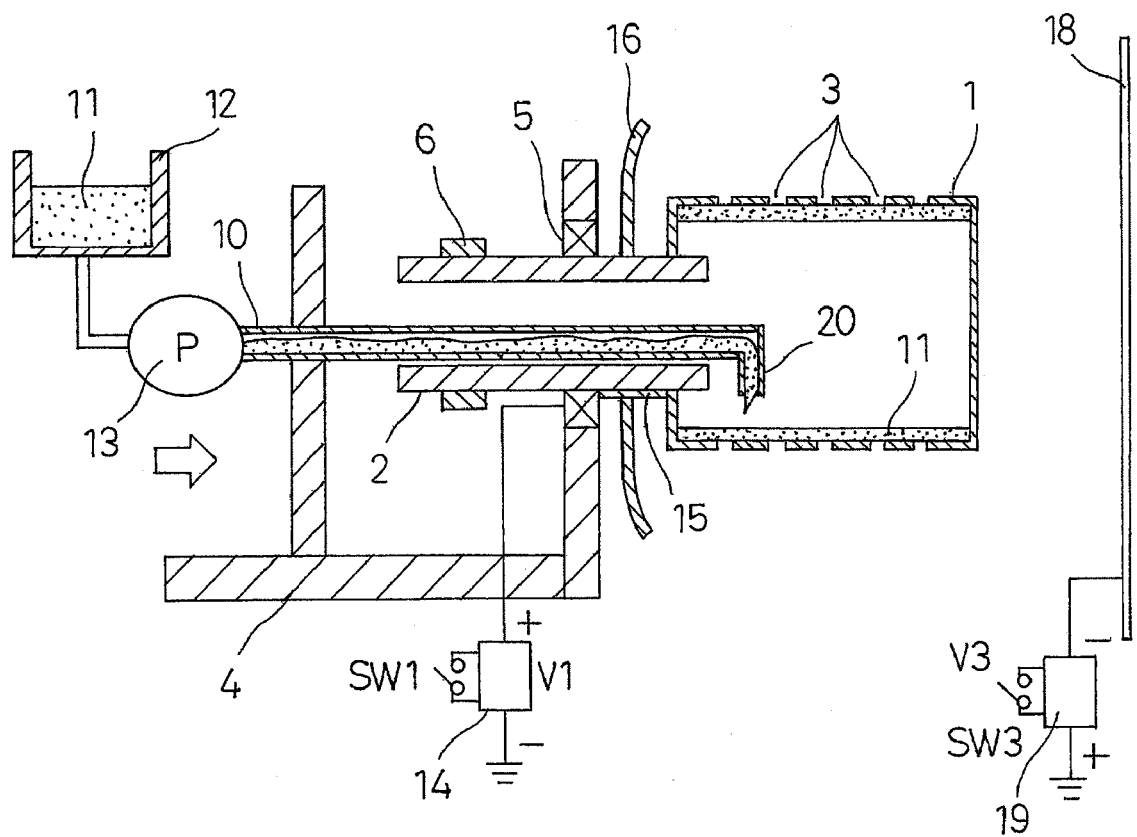
FIG. 5 is a longitudinal front view illustrating another configuration example of the same embodiment.

In the above illustrated example, an example was described in which the reflecting electrode 16 is arranged by fixing to the support frame 4 which is insulated from the cylindrical container 1, and a high voltage generated by the second high-voltage generation means 17 is applied thereto. However, as illustrated in FIG. 5, the reflecting electrode 16 may be fixed to the periphery of the rotating cylinder 2 and electrically connected to the conductive member 15. Furthermore, the same high voltage as that of the cylindrical container 1 generated by the first high-voltage generation means 14 may additionally be applied thereto. In this case, although the reflecting electrode 16 also rotates along with the cylindrical container 1, there is absolutely no effect on function.

Figure 6A:
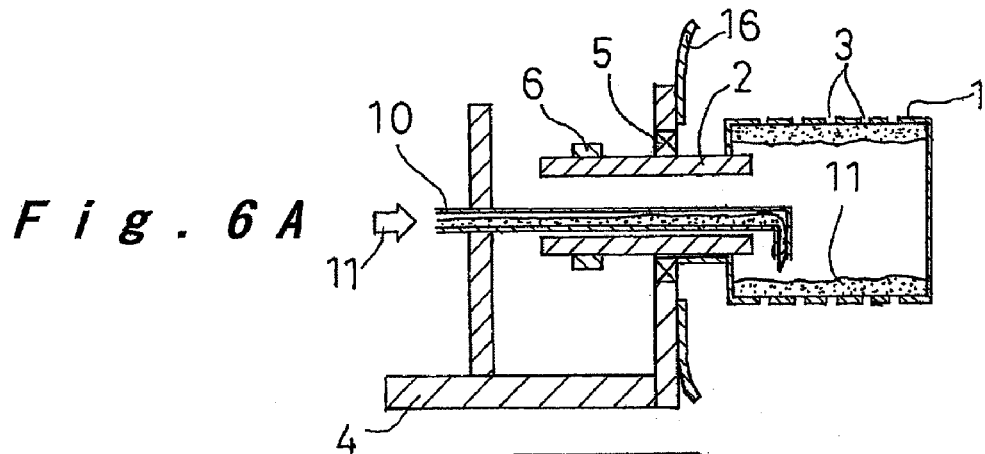
FIGS. 6A to 6C are longitudinal front views illustrating various arrangement configurations of the production apparatus of the polymer web of the same embodiment.
Figure 6B:
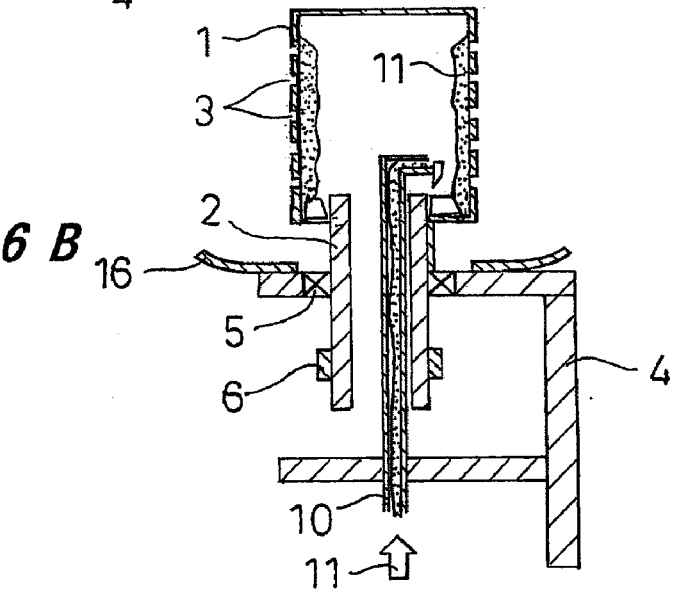
Figure 6C:
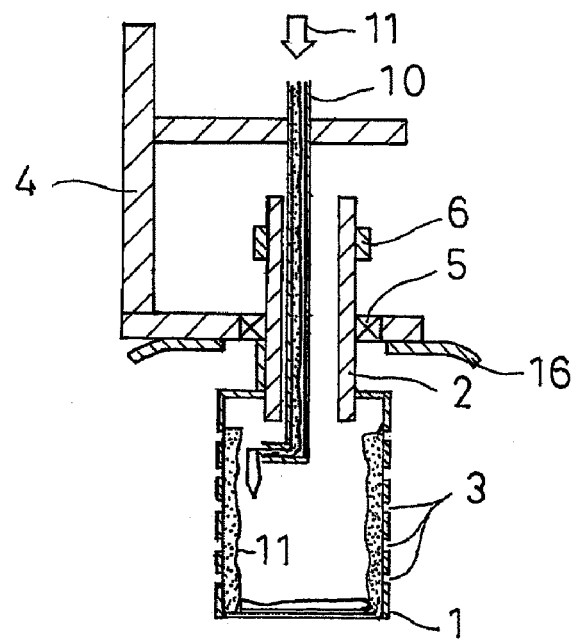

Furthermore, in the above description, as illustrated in FIG. 6A, an example was described in which the cylindrical container 1 is arranged so that its shaft direction is horizontal. However, the arrangement direction of the shaft center of the cylindrical container 1 may be arbitrary. For example, as illustrated in FIG. 6B, the shaft center of the cylindrical container 1 may be pointed in a perpendicular direction, so that the polymer solution 11 is supplied from the bottom toward the top, and the nanofibers f produced by the reflecting electrode 16 arranged on a lower side of the cylindrical container 1 are made to flow upwards. Furthermore, as illustrated in FIG. 6C, the polymer solution 11 may also be supplied from the top toward the bottom, so that the nanofibers f produced by the reflecting electrode 16 arranged on an upper side of the cylindrical container 1 are made to flow downwards. In these cases as well, by arranging the L-shaped curved portion 20 at the tip of the solution supply tube 10 so that the inserted tip 2a of the rotating cylinder 2 protrudes into the cylindrical container 1, the polymer solution 11 can be supplied into the cylindrical container 1 without any external leaks regardless of which way the cylindrical container 1 is facing. As a result, the centrifugal force resulting from the high speed rotation of the cylindrical container 1 supplies the polymer solution 11 to the whole of the inner peripheral surface, and the polymer solution 11 is discharged roughly uniformly from all of the small holes 3.

Embodiment 2

Next, Embodiment 2 of the polymer web production apparatus of the present invention will be described with reference to FIGS. 7 to 10. In the following description of the embodiments, constituent elements which are the same as in the previous embodiment are denoted using the same reference numerals, and a description thereof is omitted. Here, the points of difference will mainly be described.

In the above-described embodiment, an example was described in which a predetermined amount of the polymer solution 11 was supplied into the cylindrical container 1 based on the amount of the polymer web to be produced. However, in the present embodiment, the amount of the polymer solution 11 contained in the cylindrical container 1 is detected, and the supply pump 13 is operated and controlled based on that detected amount, so that a roughly constant amount of the polymer solution 11 is contained in the polymer solution 11.

Figure 7:
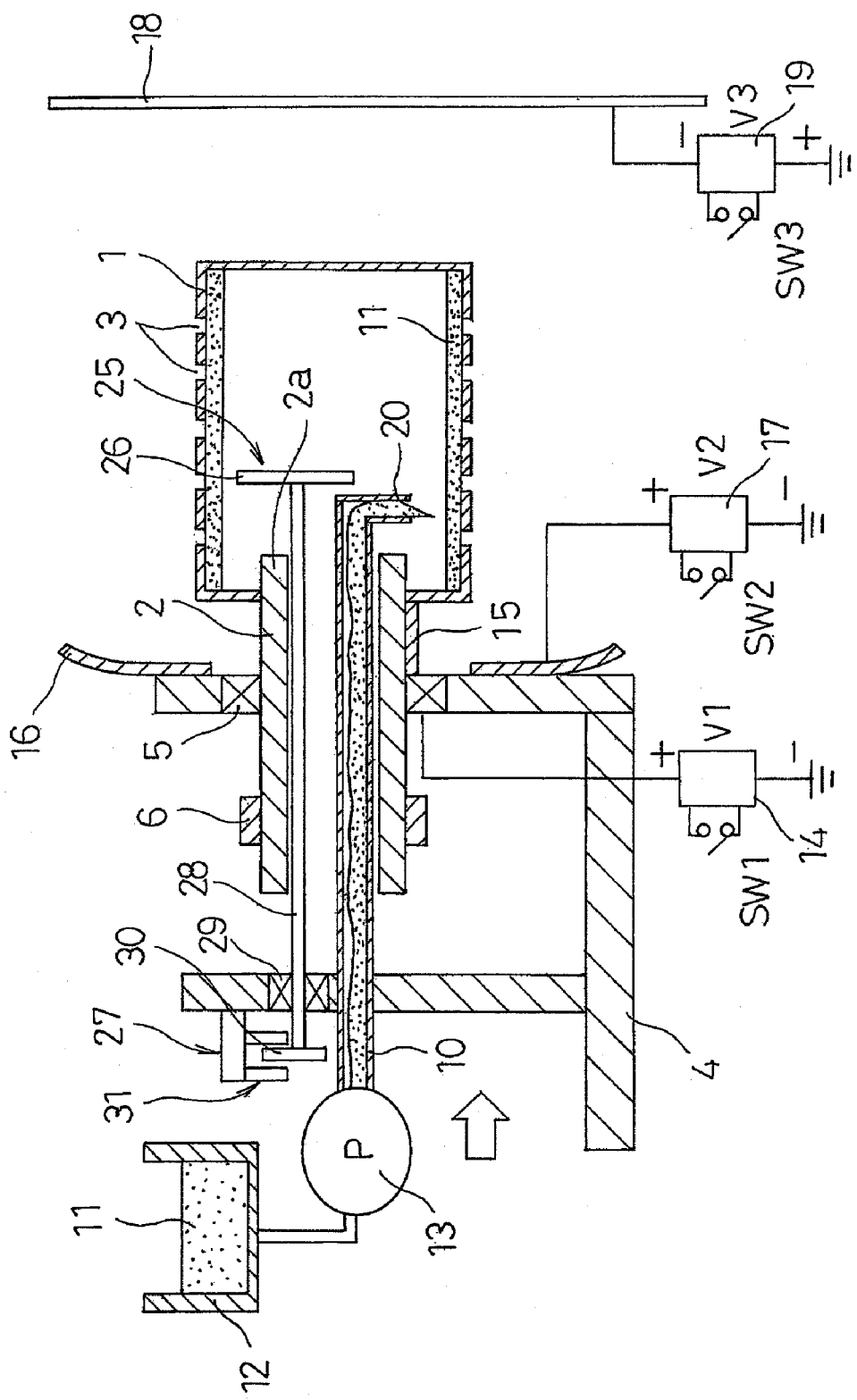
FIG. 7 is a longitudinal front view of a polymer web production apparatus of Embodiment 2 of the present invention.

In FIG. 7, contained amount detection means 25 is arranged which includes a rotating plate 26 provided so as to rotate in contact with the polymer solution 11 if the amount of the polymer solution 11 in the cylindrical container 1 reaches a predetermined amount, and rotation detection means 27 for detecting the rotation of this rotating plate 26. The supply pump 13 is operated and controlled by the input of a detection signal of the rotation detection means 27 into the control unit 21. Thus, the amount of polymer solution 11 in the cylindrical container 1 can be controlled to the predetermined amount by a simple configuration. Furthermore, uniform nanofibers f can be produced by making a constant centrifugal force to act on the polymer solution 11 in the cylindrical container 1.

Figure 8A:
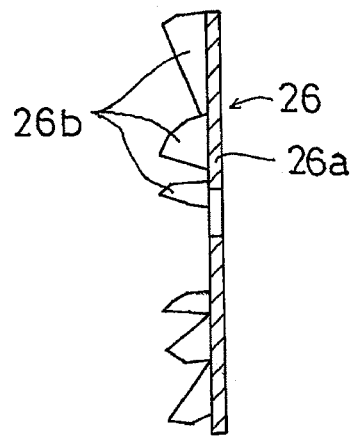
Figure 8B:
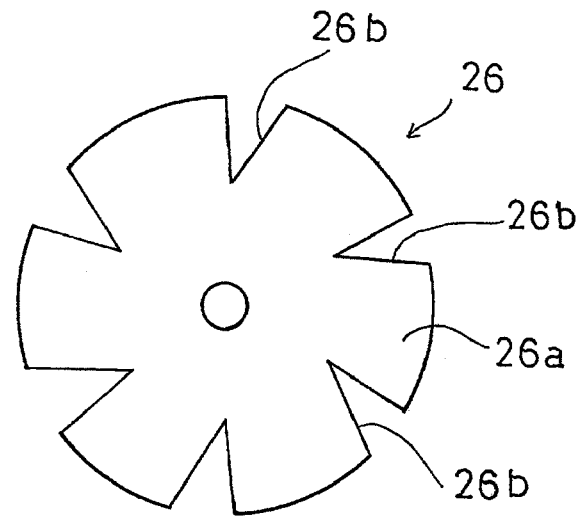
Figure 9A:
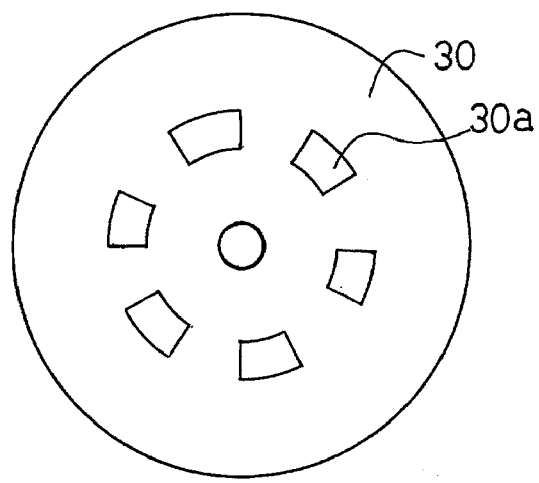
Figure 9B:
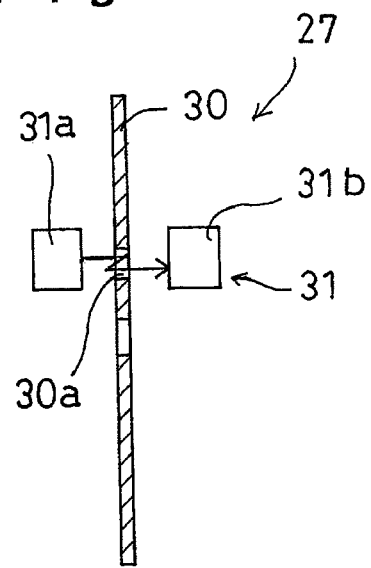

Specifically, the contained amount detection means 25 is configured so that a shaft 28, which is rotatably supported by a bearing 29 arranged on the support frame 4, passes through the rotating cylinder 2 and is inserted into the cylindrical container 1, and the rotating plate 26 is fixed on a tip thereof. As illustrated in FIGS. 8A and 8B, the rotating plate 26 is configured by a circular plate 26a having blades 26b which are formed on the periphery and which are cut so as to be orthogonal to the rotation direction. As illustrated in FIG. 9A, on the other end of the shaft 28 a detection plate 30 formed with a plurality of apertures 30a arranged at equal intervals in the periphery direction is fixed. As illustrated in FIG. 9B, a light detection device 31, which includes a light projector 31a and a light receiver 31b which are arranged so as to face each other while sandwiching the apertures 30a, is arranged on either side of the detection plate 30. The rotation detection means 27 is configured from the detection plate 30 and the light detection device 31.

In the above configuration, as illustrated in FIG. 10, as the polymer solution 11 is supplied to the cylindrical container 1 by the supply pump 13, the amount of the polymer solution 11 gradually increases. When the amount of the polymer solution 11 reaches the predetermined value L1 at time T1, the liquid surface of the polymer solution 11 comes into contact with the rotating plate 26. Then, in conjunction with the rotation of the cylindrical container 1, the rotating plate 26 starts to rotate. This rotation is detected by the rotation detection means 27, and the resultant detection signal is input into the control unit 21. When the rotation speed of the rotating plate 26 exceeds F1 at time T2, operation of the supply pump 13 is switched off by the control unit 21, and supply of the polymer solution 11 is stopped. Subsequently, the amount of polymer solution 11 in the cylindrical container 1 gradually decreases along with the production of the polymer web. When the amount of the polymer solution 11 decreases down to L1 at time T3, the rotating plate 26 is no longer in contact with the liquid surface of the polymer solution 11, and the rotation speed of the rotating plate 26 decreases. Then, when the rotation speed of the rotating plate 26 decreases down to F2 at time T4, the supply operation of the polymer solution 11 is again carried out by the supply pump 13. Subsequently, the operations from time T1 to T4 are repeated, whereby the amount of the polymer solution 11 in the cylindrical container 1 is controlled at a roughly constant level.

According to the present embodiment, by arranging the contained amount detection means 25 with a simple configuration in such a manner, the amount of the polymer solution 11 in the cylindrical container 1 can be controlled to a predetermined amount. As a result, a constant centrifugal force can be made to act on the polymer solution 11 in the cylindrical container 1, the centrifugal force acting on the polymer solution 11 which is extruded from the small holes 3 of the cylindrical container 1 is constant, and the polymer solution 11 can be uniformly discharged in a filamentous state, so that nanofibers and a polymer web can be uniformly produced.

Embodiment 3

Next, Embodiment 3 of the polymer web production apparatus of the present invention will be described with reference to FIG. 11.

In the present embodiment, as illustrated in FIG. 11, blowing means 34 is arranged between the cylindrical container 1 and the reflecting electrode 16 on one side thereof. Specifically, blowing blades 35 are installed on the rotating cylinder 2 at a position between the reflecting electrode 16 and the cylindrical container 1. As the rotating cylinder 2 rotates, air is blown toward the other side of the cylindrical container 1 as shown by arrow D.

According to this configuration, solvent which has evaporated by the air blown by the blowing means 34 is rapidly discharged, so that the solvent concentration of the surrounding atmosphere does not become high. Thus, evaporation of the solvent proceeds smoothly, the electrostatic explosion effects can be reliably obtained, and desired nanofibers f can be reliably produced. Furthermore, the advantageous effect that the flow direction of the nanofibers f during the production step can be more effectively oriented is also obtained.

Embodiment 4

Next, Embodiment 4 of the polymer web production apparatus of the present invention will be described with reference to FIG. 12.

In the above-described embodiments, examples were illustrated in which the rotating container was configured from a cylindrical container 1. However, in such cases the position in the radial direction with respect to the rotating shaft center of the nanofibers f formed by the small holes 3 on one side in the shaft center direction of the cylindrical container 1 is roughly the same as the position of the nanofibers f formed by the small holes 3 on the other side. The nanofibers f formed by these small holes 3 become entangled in the radial direction, and form a doughnut shape in which the cross-sectional shape of a tubular flow region 37 of the nanofibers f has a narrow width. In some cases the nanofibers f may not be uniformly distributed.

Thus, in the present embodiment, as illustrated in FIG. 12, by configuring the rotating container by a pointed conical cylindrical container 36, the small holes 3 are arranged so that the rotation radius decreases from one side in the shaft center direction of the rotating container toward the other side. Furthermore, a shaft center focusing electrode 38 is arranged in a shaft center hollow portion of the tubular flow region 37 of the nanofibers f at the other side in the shaft center direction of the pointed conical cylindrical container 36. In addition, a periphery focusing electrode 39 is arranged on the periphery of the tubular flow region 37. A voltage with the same polarity as the collector 18 but which is a lower voltage is applied to the shaft center focusing electrode 38, and a voltage with the same polarity as the pointed conical cylindrical container 36 and reflecting electrode 16 but which is a lower voltage is applied to the periphery focusing electrode 39.

According to the present embodiment, the nanofibers f formed by the small holes 3 on one side by the difference in the centrifugal force received by the polymer solution discharged from the respective small holes 3 flow toward an outer position away in the radial direction of the tubular flow region 37, and the nanofibers f formed by the small holes 3 on the other side flow toward an inner position on the other side in the radial direction of the tubular flow region 37. Thus, the nanofibers f formed by the respective small holes 3 do not overlap in the radial direction, and the flow region cross-sectional shape of the nanofibers f becomes more like a circle than a narrow-width doughnut shape. Furthermore, by arranging at least one of the shaft center focusing electrode 38 and the periphery focusing electrode 39, the size of the cross-sectional shape of the center hollow portion of the tubular flow region 37 of the nanofibers f can be made substantially smaller, and the shape and the arrangement of the periphery focusing electrode 39 can be appropriately set, which enables the tubular flow region 37 of the nanofibers f to also be focused in an arbitrary cross-sectional shape such as a rectangle and the like.

In this Embodiment 4, although the nanofibers f were adhered and deposited on the collector 18 using the shaft center focusing electrode 38 and the periphery focusing electrode 39, the present embodiment is not limited to this. As illustrated in FIG. 13, even without the shaft center focusing electrode 38 and the periphery focusing electrode, if the pointed conical cylindrical container 36 is used as the rotating container, the surface area of the center portion on which nanofibers f are not adhered is less than that for a cylindrical container. Furthermore, the adhered and deposited nanofibers f are also adhered more uniformly.

Embodiment 5

Figure 14:
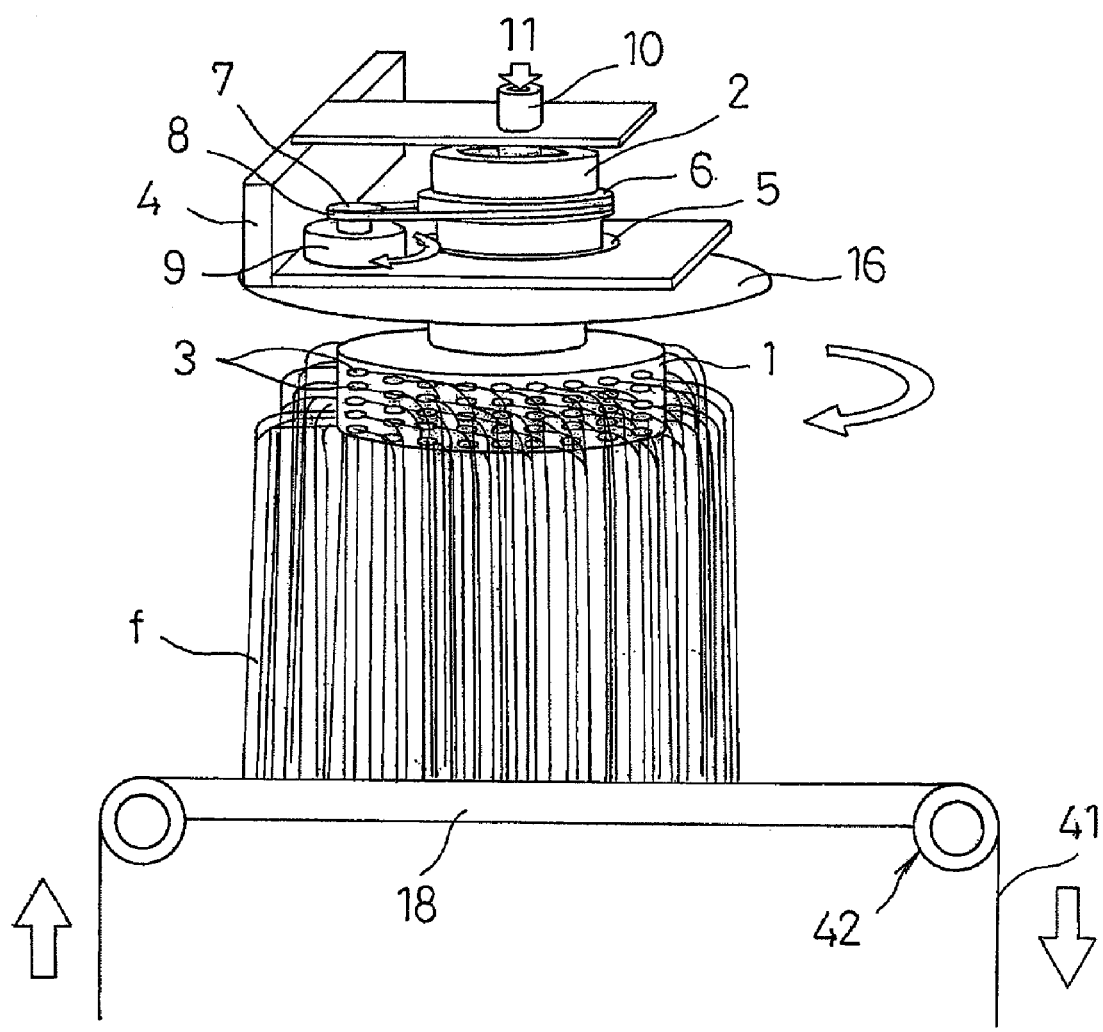
FIG. 14 is a perspective view of the polymer web production apparatus of Embodiment 5 of the present invention.

Next, Embodiment 5 of the polymer web production apparatus of the present invention will be described with reference to FIG. 14.

In the above-described embodiments, examples were described in which the nanofibers f were deposited on the collector 18, and the polymer web formed on the collector 18 was collected, or a member for forming the polymer web was arranged on the collector 18, and the polymer web was collected therefrom. However, in the present embodiment, as illustrated in FIG. 14, sheet material moving means 42 is provided on and along the collector 18 for moving a sheet material 41, on which the nanofibers f adhere and deposit, at a predetermined speed. By configuring in this manner, a sheet on which a polymer web with the required thickness is formed can be continuously produced.

Embodiment 6

Next, Embodiment 6 of the polymer web production apparatus of the present invention will be described with reference to FIGS. 15 to 17.

In the above-described Embodiment 5, an example was described in which the sheet material 41 was moved along the upper surface of the flat collector 18 by the sheet material moving means 42. However, in the present embodiment, by employing a drum-shaped collector 43 having a diameter and a width dimension much larger than the diameter of the cylindrical container 1, the sheet material 41 is moved along with the rotation of the drum-shaped collector 43 in a state where the sheet material 41 is wound around a part of the periphery of the drum-shaped collector 43. Namely, the drum-shaped collector 43 fulfills both a function as the collector and a function as the sheet material moving means. The drum-shaped collector 43 is rotatably driven at a predetermined rotation speed in the direction of arrow Q around the shaft center orthogonal to the movement direction of the rotating shaft center of the cylindrical container 1 and the sheet material 41, at a position where a suitable gap is provided with the other side in the shaft center direction of the cylindrical container 1. The sheet material 41 is supplied to the periphery of the drum-shaped collector 43 from a sheet supply roll 44, so that a polymer web W formed from the nanofibers f is picked up by a sheet pickup roll 45 in a deposited state. The sheet material 41 starts to be picked up by the periphery of the drum-shaped collector 43 at a position where the sheet material 41 is separated by a suitable distance on the upstream side in the sheet material movement direction than the position facing the cylindrical container 1 of the drum-shaped collector 43. The sheet material 41 is separated from the periphery of the drum-shaped collector 43 at a position which is separated by a suitable distance on the downstream side of the sheet material movement direction.

Furthermore, in the present embodiment, a blowing fan 46 is arranged on one side of the rotating cylinder 2 which rotatably supports the cylindrical container 1 so that it can be driven on the support frame 4. This blowing fan 46 blows air as shown by the arrow D from one side of the cylindrical container 1 toward the other side, whereby the nanofibers f are oriented and made to flow as shown by the arrow F by this blown air and the electric field between the cylindrical container 1 and the drum-shaped collector 43. Furthermore, in the present embodiment, the entire nanofiber production apparatus 50, including the support frame 4, the rotating cylinder 2, and the cylindrical container 1, has a ground potential, and a high voltage is applied to the drum-shaped collector 43 by the third high-voltage generation means 19.

An experiment was carried out in which, in such a configuration, for example, the cylindrical container 1 diameter was set at 30 mm and the distance between the other end of the cylindrical container 1 and the periphery of the drum-shaped collector 43 was set at 500 mm, the used polymer solution 11 was formed from 10% PVA (polyvinyl alcohol) as the polymer material and 90% water as the solvent, the nanofibers f were produced by rotating the cylindrical container 1 at 3,000 rpm, and the resultant product was deposited for 10 minutes on the drum-shaped collector 43. As illustrated in FIG. 16, the deposition distribution exhibited a roughly trapezoid shape having a slight depression in the center top portion, with a radius of about 500 mm. A maximum deposited amount of about 200 μm was confirmed.

Here, to produce in one production step a polymer web W having a larger width dimension than the dimension of a roughly uniform range of deposited amount at the top of the deposition distribution, in the present embodiment, the nanofiber production apparatus 50 is configured so as to be reciprocally moved in the shaft center direction of the drum-shaped collector 43, that is, in the direction of the arrow S parallel to the width direction of the sheet material 41, by deposition movement means 51.

Figure 15:
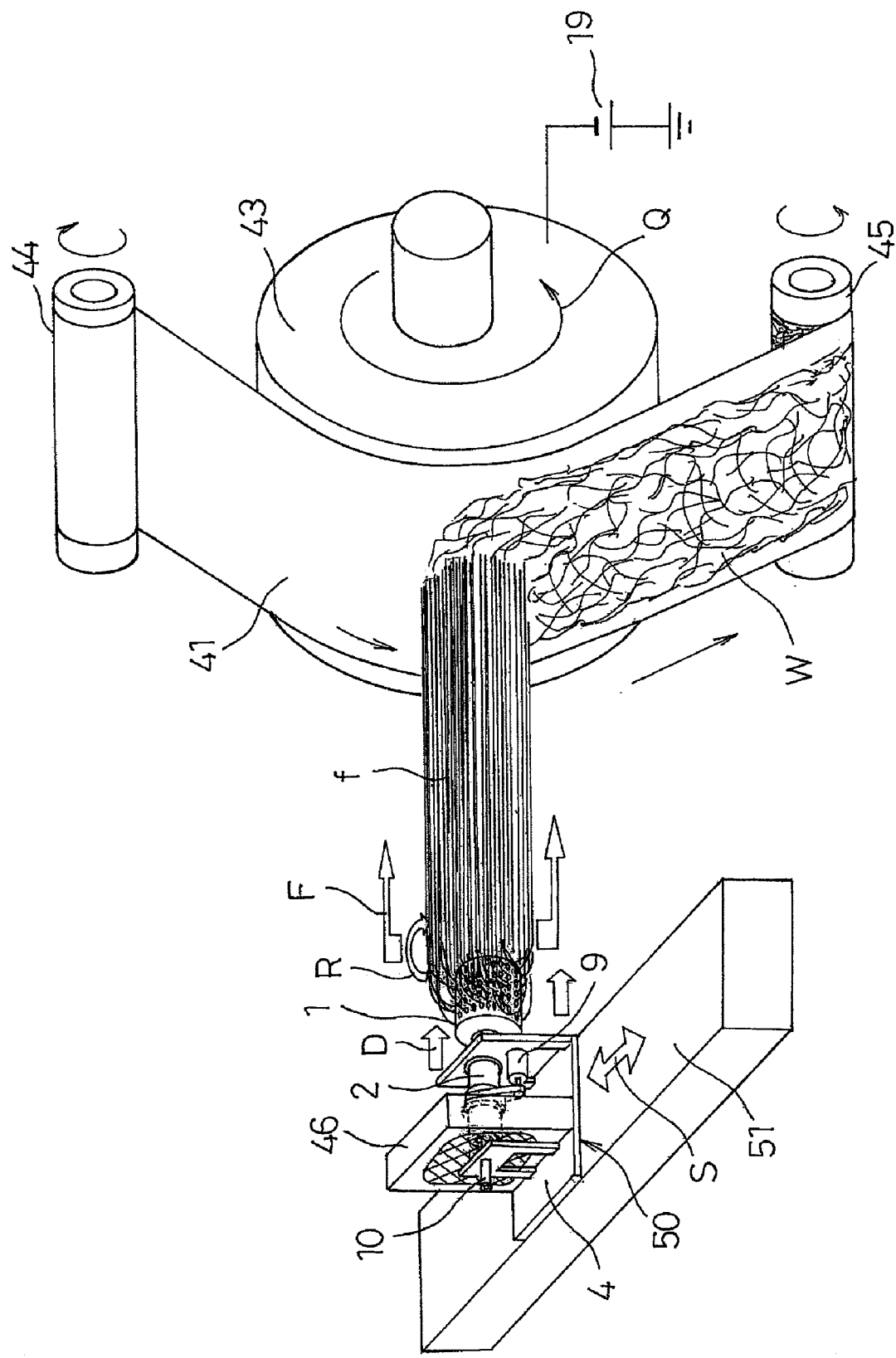
FIG. 15 is a perspective view of the polymer web production apparatus of Embodiment 6 of the present invention.
Figure 16:
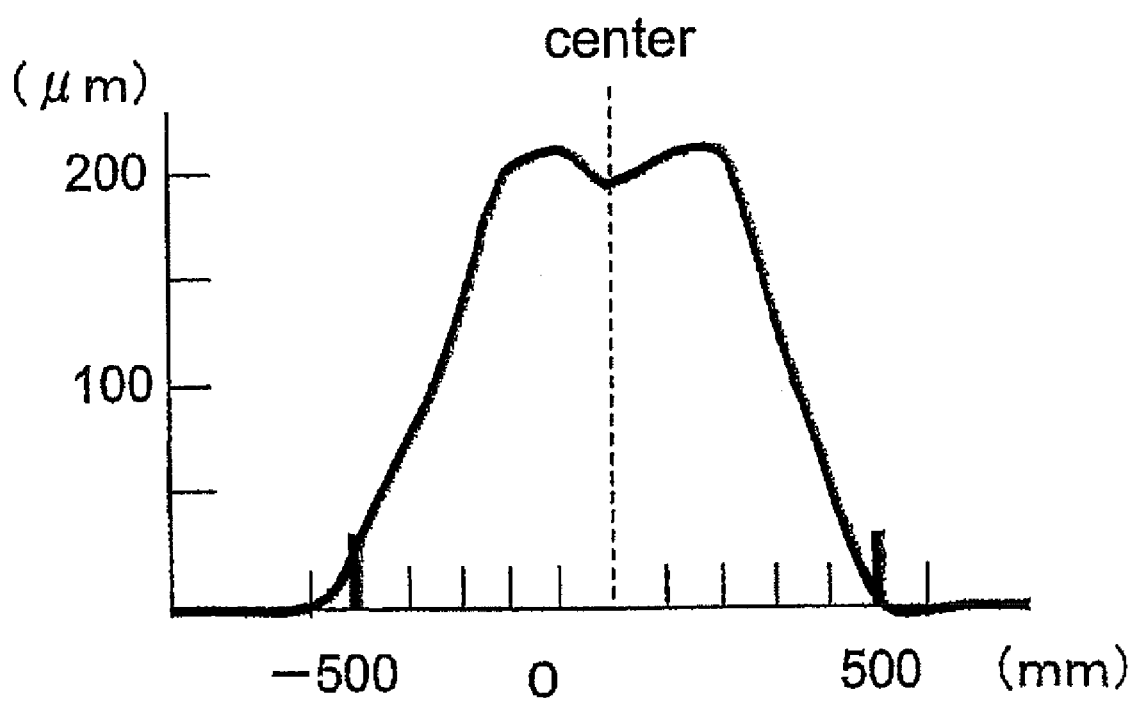
FIG. 16 is an explanatory diagram of the deposition state of nanofibers.

The example of FIG. 15 was illustrated in which the polymer web W supported on the sheet material 41 is produced by arranging the sheet material 41 on the periphery of the drum-shaped collector 43, and depositing the nanofibers f on the sheet material 41. However, the nanofibers f may be directly deposited on the periphery of the drum-shaped collector 43, and the produced polymer web W may be collected by peeling it off from the periphery at the downstream side in a rotation direction of the drum-shaped collector 43.

Furthermore, the example of FIG. 15 was described in which the rotating cylinder 2 which fixed the cylindrical container 1 is rotatably supported by the support frame 4, the rotating cylinder 2 is rotatably driven by the motor 9 arranged on a side thereof, and the blowing fan 46 is arranged on one side of the rotating cylinder 2. However, to orient and make the produced nanofibers f flow more effectively, it is preferred to configure the nanofiber production apparatus 50 as shown in FIG. 17.

In FIG. 17, a rotating shaft 52 which passes through an aperture portion on one side end of the cylindrical container 1, passes through a shaft center position in the cylindrical container 1, and is fixed to the other side wall face, is rotatably and drivably supported by a rotation drive unit 53. The rotation drive unit 53 houses in a support cylinder 54 the motor 9 as rotation drive means and a bearing 55 which rotatably supports the rotating shaft 52. The motor 9 and the bearing 55 are arranged in parallel in the shaft center direction. The rotation drive unit 53 is coupled with an output shaft of the motor 9 and the rotating shaft 52 by a shaft joint 56. The support cylinder 54 is arranged and supported in a concentric shape in a wind hollow cylinder 58 via a plurality of straightening vanes 57 which are radially arranged from the periphery of the support cylinder 54. The wind hollow cylinder 58 is provided with a fan arrangement cylinder 58b via a pointed conical member 58a whose diameter narrows towards the opposite side of the cylindrical container 1, and a blowing fan 59. This nanofiber production apparatus 50 is fixed to a mobile body 51a of deposition movement means 51 by a mounting leg 60 which hangs down from the bottom edge of the wind hollow cylinder 58. The nanofiber production apparatus 50 is movably supported in a shaft direction of the drum-shaped collector 43. Furthermore, it is preferred to supply the polymer solution 11 into the cylindrical container 1 through the solution supply tube 10 (not illustrated) which passes through a gap between the rotating shaft 52 and an aperture portion on one side end of the cylindrical container 1.

According to this configuration, the nanofiber production apparatus 50 can be configured as a compact unit. In addition, the produced nanofibers f can be oriented and made to flow more effectively, since air is uniformly blown across the whole periphery of the cylindrical container 1 due to the wind generated by the blowing fan 59 passing through the wind hollow cylinder 58 and being efficiently guided by the straightening vanes 57.

Embodiment 7

Next, Embodiment 7 of the polymer web production apparatus of the present invention will be described with reference to FIGS. 18 to 20.

Figure 18:
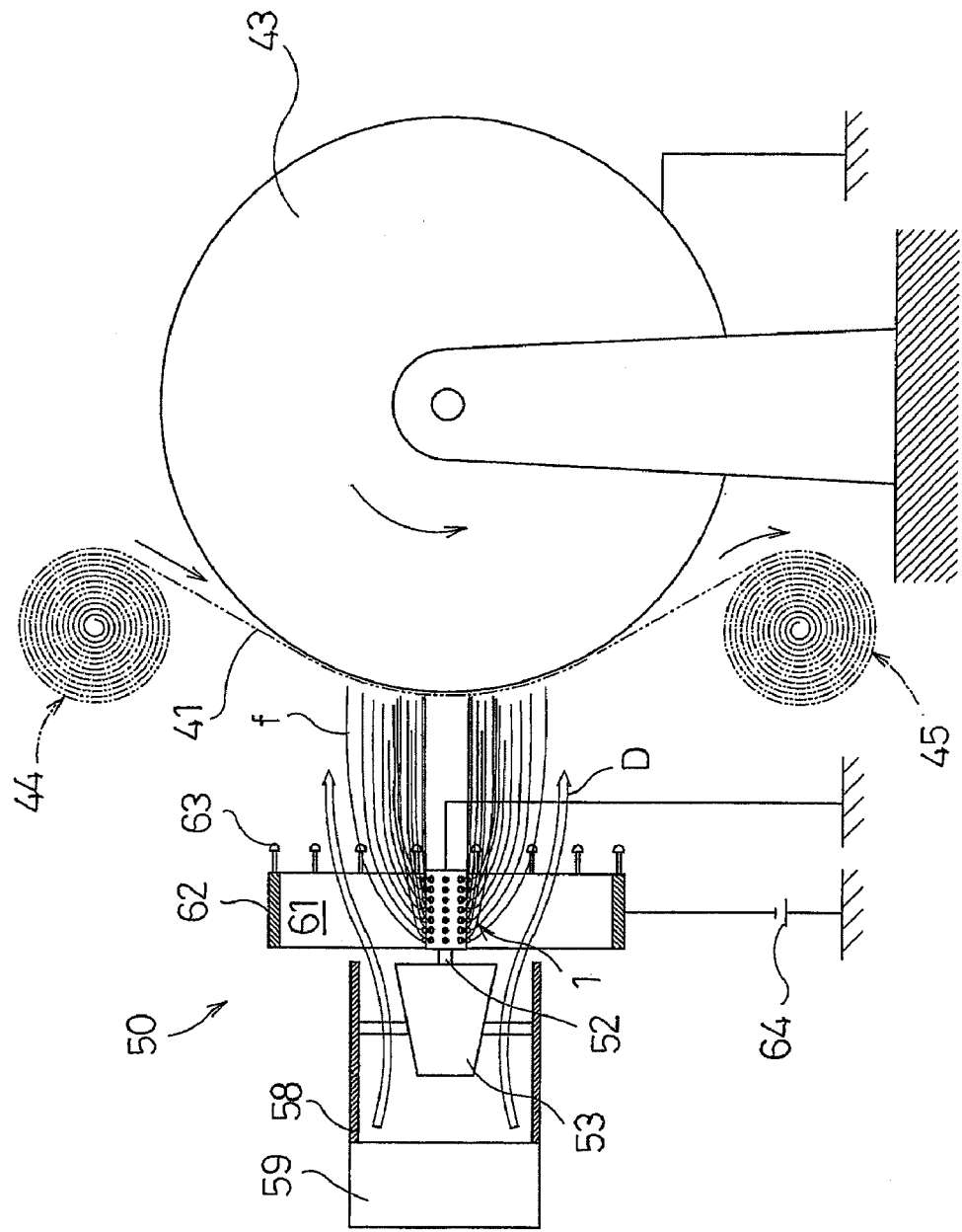
FIG. 18 is a perspective view of the polymer web production apparatus of Embodiment 7 of the present invention.
Figure 19:
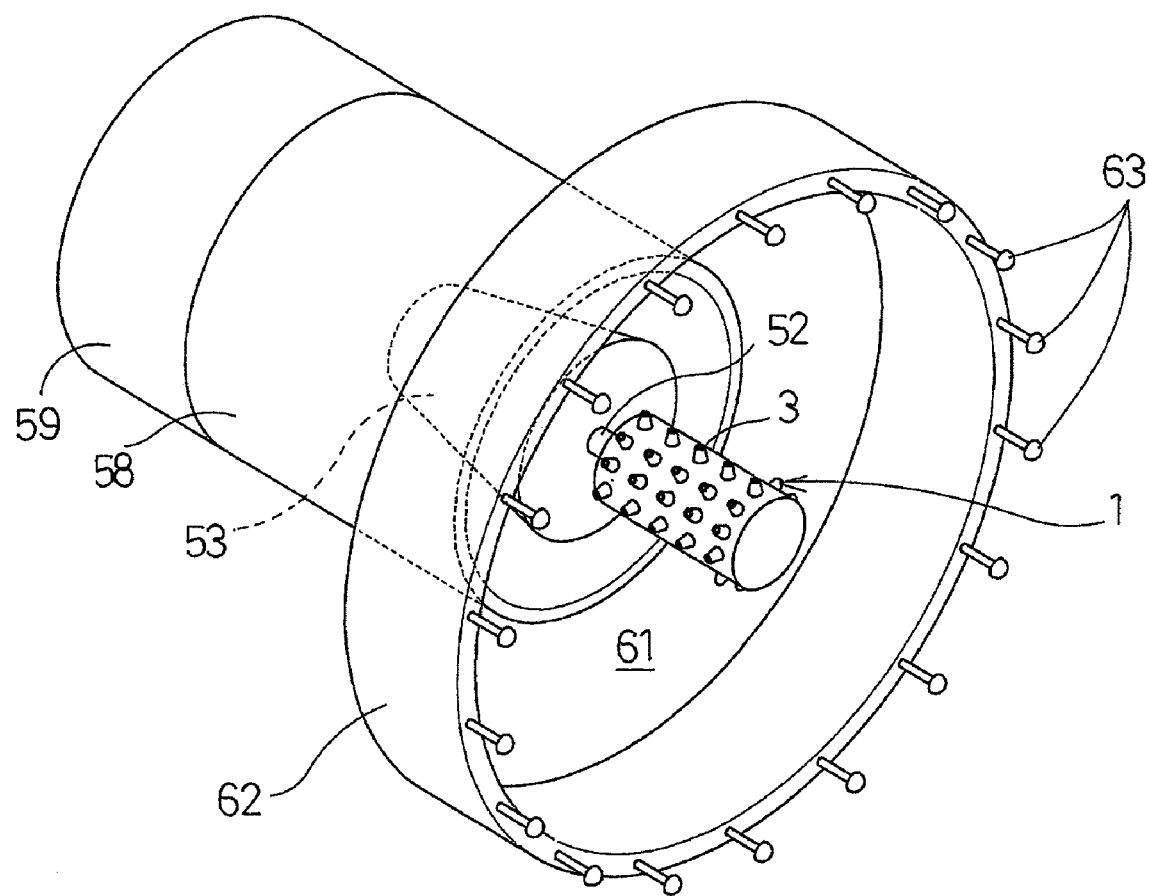
FIG. 19 is a perspective view of the main structures in the same embodiment.
Figure 20:
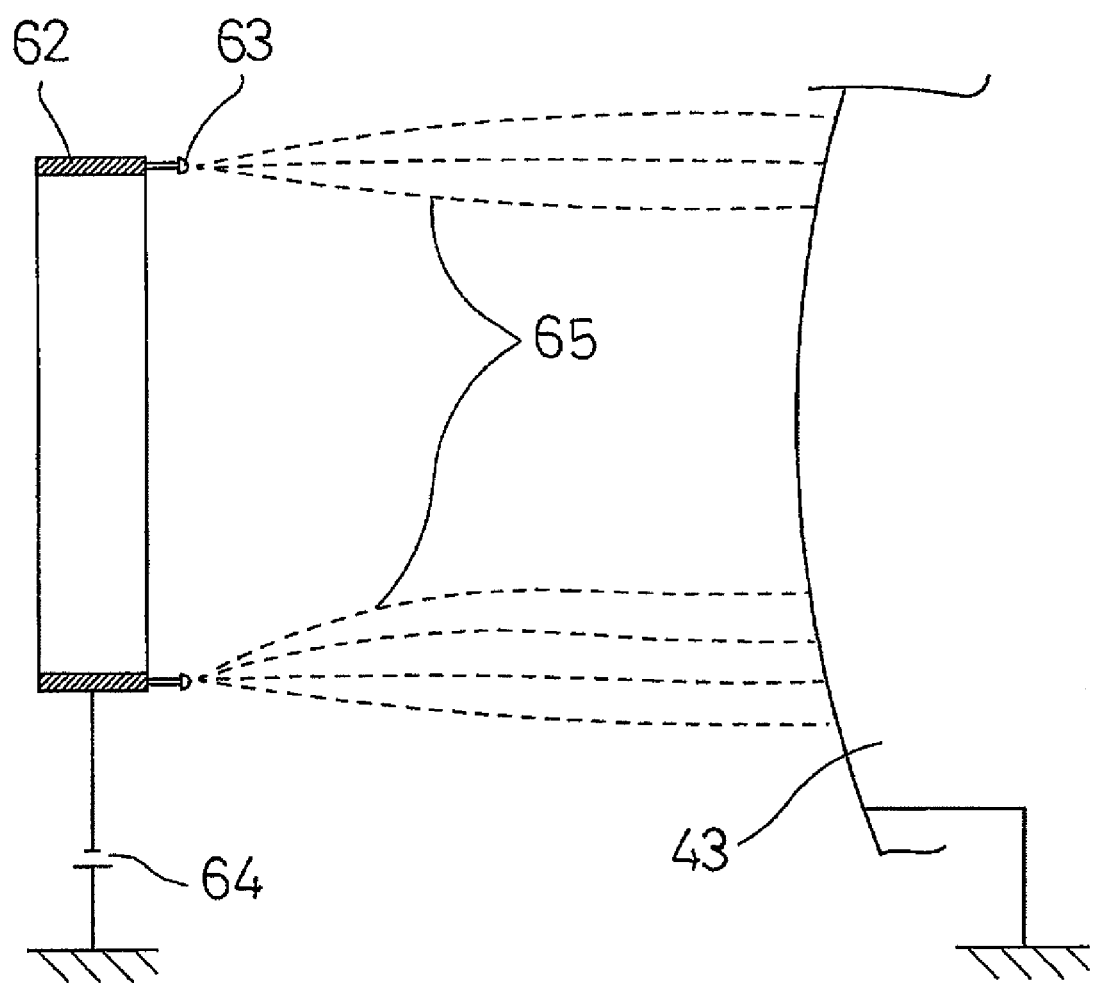
FIG. 20 is an explanatory diagram of the effects of an electrode bar provided on a ring electrode in the same embodiment.
Figure 21:
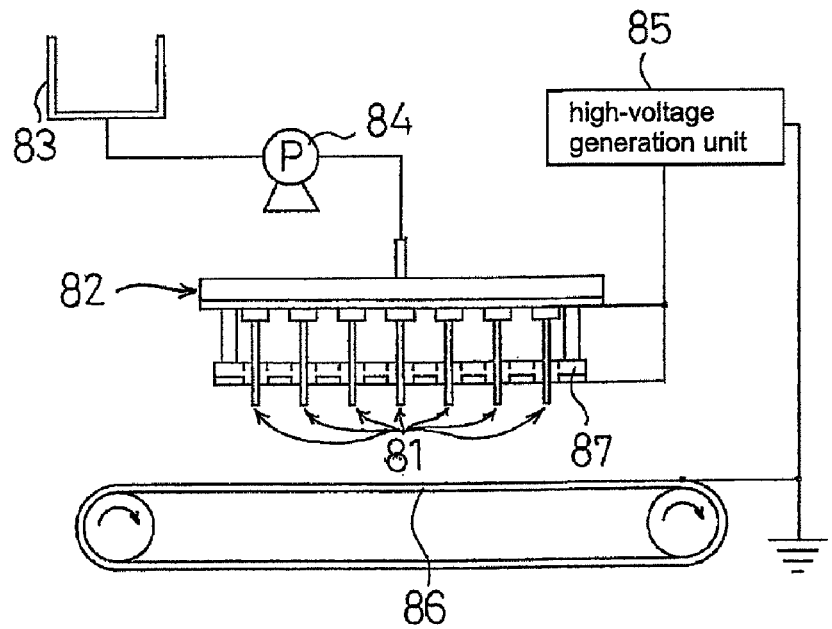
FIG. 21 is a schematic configuration diagram of a conventional example of a polymer web production apparatus.
Figure 22A:
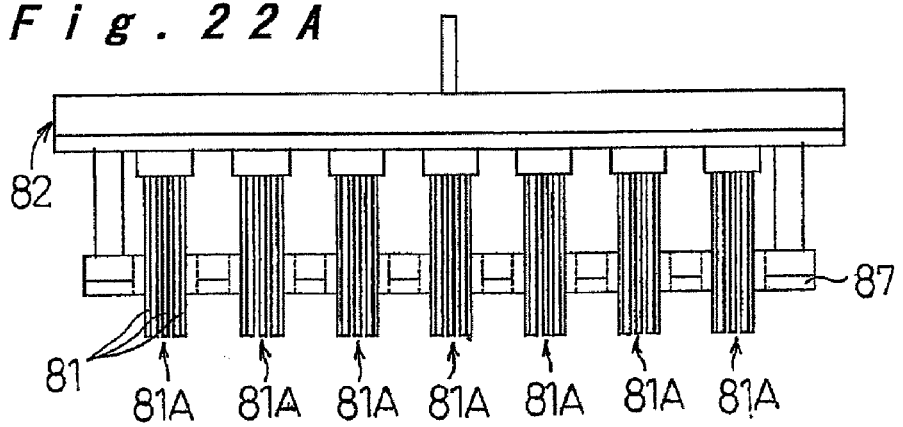
Figure 22B:
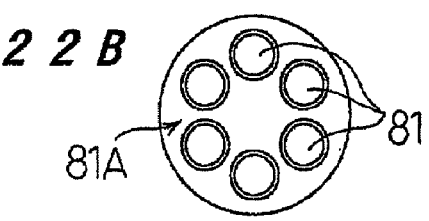
Figure 23:
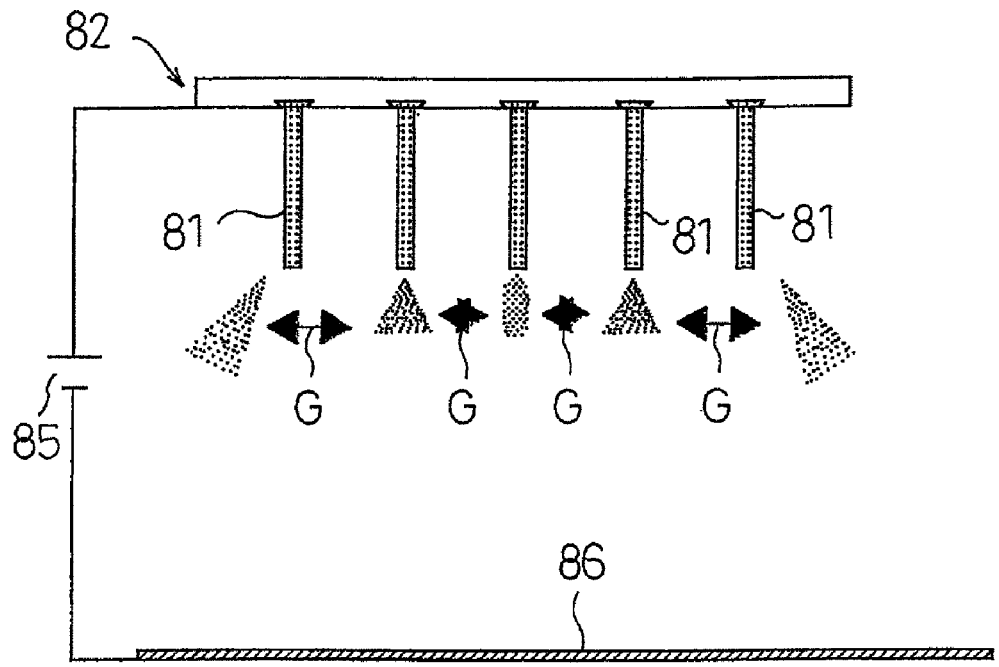
FIG. 23 is an explanatory diagram of problems in the same conventional example.
Figure 24:
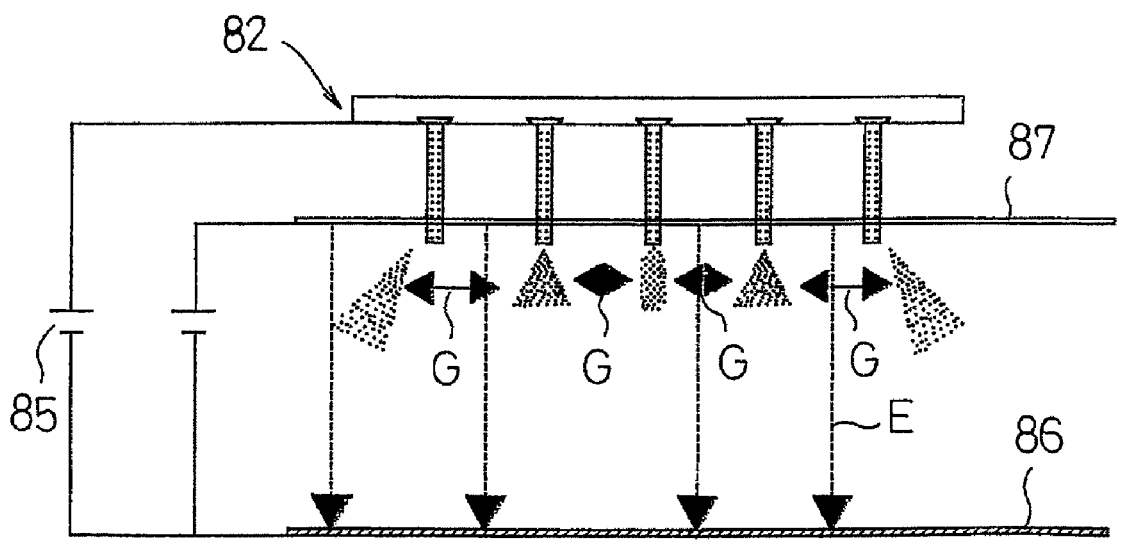
FIG. 24 is an explanatory diagram of further problems in the same conventional example.

In the present embodiment, as illustrated in FIGS. 18 and 19, a ring electrode 62 is arranged on the periphery of the cylindrical container 1 so as to enclose the surroundings of the cylindrical container 1 with a spinning space 61 open therebetween. Furthermore, on an edge of the drum-shaped collector 43 side of the ring electrode 62, an electrode bar 63 with a round tip for electric flux line control is arranged with an interval provided in the peripheral direction. The reason for making the tip of the electrode bar 63 round is to prevent an electric wind from being produced due to the concentration of an extreme charge.

Here, the cylindrical container 1 serves as a ground potential, and a positive or negative (in the example illustrated in the drawings, negative) high voltage generated by high-voltage generation means 64 of 1 kV to 100 kV, and preferably 10 kV to 100 kV, is applied to the ring electrode 62. As a result, an electric field is generated in the spinning space 61 between the cylindrical container 1 and the ring electrode 62. Furthermore, the drum-shaped collector 43 serves to provide a ground potential for collecting the nanofibers f in a state charged by the spinning space 61. Furthermore, since it is sufficient just for the electric field to be generated in the spinning space 61 between the cylindrical container 1 and the ring electrode 62, a positive or a negative high voltage may be applied to the cylindrical container 1, and a high voltage with the reverse polarity to that of the cylindrical container 1 may be applied to the ring electrode 62 or the ring electrode 62 may be grounded. Furthermore, a high voltage with the reverse polarity to that of the nanofibers f may also be applied to the drum-shaped collector 43, whereby the collection efficiency can be increased. In addition, by arranging the electrode bar 63 on the ring electrode 62, charge concentrates on the tip of the electrode bar 63, which causes a charge with the reverse polarity to be generated on a portion facing the electrode bar 63 of the drum-shaped collector 43. As a result, as illustrated in FIG. 20, electric force lines 65 are generated between the ring electrode 62 and the drum-shaped collector 43. This allows the drum-shaped collector 43 or the cylindrical container 1 to serve as a ground potential, so that the high voltage is only applied to the ring electrode 62. By using such a simple and safe configuration, the charged nanofibers f can be obtained stably due to the stronger effects of inducing the nanofibers f onto the drum-shaped collector 43.

According to this configuration, while supplying the polymer solution 11 into the cylindrical container 1, the cylindrical container 1 is rotatably driven and a high voltage is applied to the ring electrode 62 by the high-voltage generation means 64, to generate a strong and uniform electric field in the spinning space 61 which is between the cylindrical container 1 and the ring electrode 62. Due to this generated electric field and the centrifugal force generated by the rotation of the cylindrical container 1, the polymer solution 11 in the cylindrical container 1 is radially discharged from the plurality of small holes 3 toward the ring electrode 62, so that a large amount of nanofibers strongly charged in the spinning space 61 are efficiently spun. These fibers are oriented and made to flow from the spinning space 61 toward the drum-shaped collector 43 by the air flow blown from the blowing fan 59 toward the spinning space 61, and are thereby discharged. By rapidly discharging the fibers spun in this manner by the air flow from the spinning space 61, there is no risk of the spinning effect in the spinning space 62 being inhibited by the charged fibers, so that such spinning effect can be stably obtained. Subsequently, while the fibers are being oriented and made to flow from the spinning space 61 toward the drum-shaped collector 43, the spun fibers are drawn by an electrostatic explosion, so that the nanofibers f are efficiently produced in a large amount having a diameter in the order of submicrons. The thus-produced nanofibers f are collected on the drum-shaped collector 43 which is grounded or to which a voltage with a reverse polarity to the charged polarity of the fibers was applied.

Furthermore, since the electrode bar 63 for electric flux line control is arranged on the edge on the drum-shaped collector 43 side of the ring electrode 62 with an interval provided therebetween, the electric flux lines 65 generated between the ring electrode 62 and the drum-shaped collector 43 are formed uniformly and stably. Since the charge of the nanofibers f is induced by these electric flux lines, the produced nanofibers f can be stably deposited and collected on the drum-shaped collector 43.

Furthermore, in the present embodiment, although the ring electrode 62 was arranged facing the periphery of the cylindrical container 1 so as to enclose the surroundings of the cylindrical container 1, this arrangement position can be changed. For example, the ring electrode 62 may be moved around to the drum-shaped collector 43 side with respect to the cylindrical container 1. Furthermore, the width dimension of the ring electrode 62 may be made shortened than the length in the shaft center direction of the cylindrical container 1. As a lower limit, as long as a bar-shaped electrode can be formed, the effects can be provided.

In the above description of the respective embodiments, examples of tubular containers, such as the cylindrical container 1 and the pointed conical cylindrical container 36, which are rotatably driven around the shaft center, were described as the rotating container. However, the present invention is not limited to a tubular container. The container can be formed in an arbitrary shape as long as the polymer solution 11 can be contained while rotating, and such container has a function of forming polymer filaments by discharging the polymer solution 11 from the small holes 3 by centrifugal force.

INDUSTRIAL APPLICABILITY

According to the nanofiber and polymer web production method and apparatus of the present invention, nanofibers formed from a polymer material having a diameter in the order of submicrons are efficiently produced from a filamentous polymer solution which is discharged from a plurality of small holes of a rotating container. Furthermore, since the produced nanofibers are oriented and made to flow in a shaft center direction of the rotating container, the polymer web can be produced by simply collecting the nanofibers in a desired range. In addition, since only high-quality nanofibers are collected because only suitable nanofibers are oriented and made to flow, the present invention can be preferably utilized to produce a highly porous web which may be suitably applied in battery separators, polymer electrolyte membranes for fuel cells, electrodes and the like, with high productivity.

The invention claimed is:
1. A method for producing nanofibers, comprising:
    rotating a container on a shaft center of the container, the container provided with a plurality of small holes formed in a circumferential surface of the container, and the container being filled with a polymer solution made by dissolving a polymer material in a solvent, while an electric field generated by a high voltage generator is applied to a spinning space formed between the container and a ring electrode surrounding the container;
    discharging the polymer solution through the plurality of small holes of the rotated container utilizing centrifugal force and application of an electric field to produce electrically-charged fibers;
    discharging the electrically-charged fibers from the spinning space by air blow; and
    drawing the discharged electrically-charged fibers by an electrostatic explosion.
2. The method for producing nanofibers according to claim 1, wherein the air blow is produced by a blowing fan arranged on one side of the rotating container and aligned with the shaft center.
3. The method for producing nanofibers according to claim 2, further comprising: applying a voltage having a difference in potential with respect to the charge of the nanofibers on a conductive collector arranged to the container with an interval provided in the other side of the shaft center direction, or grounding the collector to deposit the generated nanofibers on a sheet of the collector.

* * * * *